(12) United States Patent
Zacharia et al.

(10) Patent No.: US 11,625,874 B2
(45) Date of Patent: Apr. 11, 2023

(54) SYSTEM AND METHOD FOR INTELLIGENTLY GENERATING DIGITAL COMPOSITES FROM USER-PROVIDED GRAPHICS

(71) Applicant: Triple Lift, Inc., New York, NY (US)

(72) Inventors: Shaun T. Zacharia, New York, NY (US); Samuel Benjamin Shapiro, New York, NY (US); Alexander Prokofiev, South Plainfield, NJ (US); Luis Manuel Bracamontes Hernandez, New York, NY (US)

(73) Assignee: Triple Lift, Inc., New York, NY (US)

( * ) Notice: Subject to any disclaimer, the term of this patent is extended or adjusted under 35 U.S.C. 154(b) by 0 days.

(21) Appl. No.: 16/984,608

(22) Filed: Aug. 4, 2020

(65) Prior Publication Data
US 2022/0044459 A1    Feb. 10, 2022

(51) Int. Cl.
| | | |
|---|---|---|
| *G06T 11/60* | (2006.01) | |
| *G06T 7/11* | (2017.01) | |
| *G06V 10/44* | (2022.01) | |
| *G06V 10/46* | (2022.01) | |
| *G06V 20/40* | (2022.01) | |
| *H04N 21/431* | (2011.01) | |

(52) U.S. Cl.
CPC ............... *G06T 11/60* (2013.01); *G06T 7/11* (2017.01); *G06V 10/44* (2022.01); *G06V 10/462* (2022.01); *G06V 20/49* (2022.01); *G06T 2207/20084* (2013.01); *H04N 21/4314* (2013.01)

(58) Field of Classification Search
CPC . G06T 11/60; G06T 7/11; G06T 2207/20084; G06K 9/4671; G06K 9/00765; G06K 9/4604; H04N 21/4314
See application file for complete search history.

(56) References Cited

U.S. PATENT DOCUMENTS

| | | | |
|---|---|---|---|
| 7,667,710 B2 | 2/2010 | MacInnis et al. | |
| 10,430,662 B2 | 10/2019 | Katz et al. | |
| 10,898,809 B2 | 1/2021 | Nay | |
| 2008/0231480 A1 | 9/2008 | Lai et al. | |
| 2011/0026840 A1* | 2/2011 | Tao | G06K 9/00684 |
| | | | 382/224 |
| 2012/0127204 A1 | 5/2012 | Distler | |
| 2013/0091519 A1 | 4/2013 | McLauchlan et al. | |
| 2014/0359656 A1 | 12/2014 | Banica et al. | |

(Continued)

OTHER PUBLICATIONS

Michael Gygli et al., "Ridiculously Fast Shot Boundary Detection with Fully Convolutional Neural Networks", 978-1-5386-7021-7/18/$31.00 c 2018 IEEE.

(Continued)

*Primary Examiner* — Jianxun Yang
(74) *Attorney, Agent, or Firm* — Goodwin Procter LLP

(57) ABSTRACT

A system and method for inserting a composited image or otherwise generated graphic into a selected video by way of a programmatic process. According to some embodiments, a system may comprise an Automated Placement Opportunity Identification (APOI) engine, a Placement Insertion Interface (PII) engine, a preview system, and an automated compositing service. The system finalizes a graphic composite into a video and provides a user with a preview for final export or further manipulation.

16 Claims, 13 Drawing Sheets

ASO Embodiment–Exemplary Important Feature Procedure

(56) References Cited

U.S. PATENT DOCUMENTS

| | | |
|---|---|---|
| 2016/0071544 A1 | 3/2016 | Waterston et al. |
| 2016/0277781 A1 | 9/2016 | Lennon et al. |
| 2017/0330363 A1 | 11/2017 | Song et al. |
| 2017/0357877 A1 | 12/2017 | Lin et al. |
| 2019/0080721 A1 | 3/2019 | Fay |
| 2019/0147305 A1 | 5/2019 | Lu et al. |
| 2019/0222776 A1 | 7/2019 | Carter et al. |
| 2019/0251401 A1* | 8/2019 | Shechtman ............. G06T 11/00 |
| 2019/0377949 A1* | 12/2019 | Chen ...................... G06V 10/82 |
| 2020/0074231 A1* | 3/2020 | Ishii ..................... G06K 9/6257 |
| 2020/0396521 A1 | 12/2020 | Weiner et al. |

OTHER PUBLICATIONS

International Search Report and Written Opinion for PCT/US2021/044374 dated Nov. 18, 2021.
U.S. Appl. No. 16/983,064, filed Aug. 3, 2020, Zacharia et al.
U.S. Appl. No. 16/986,617, filed Aug. 6, 2020, Zacharia et al.

* cited by examiner

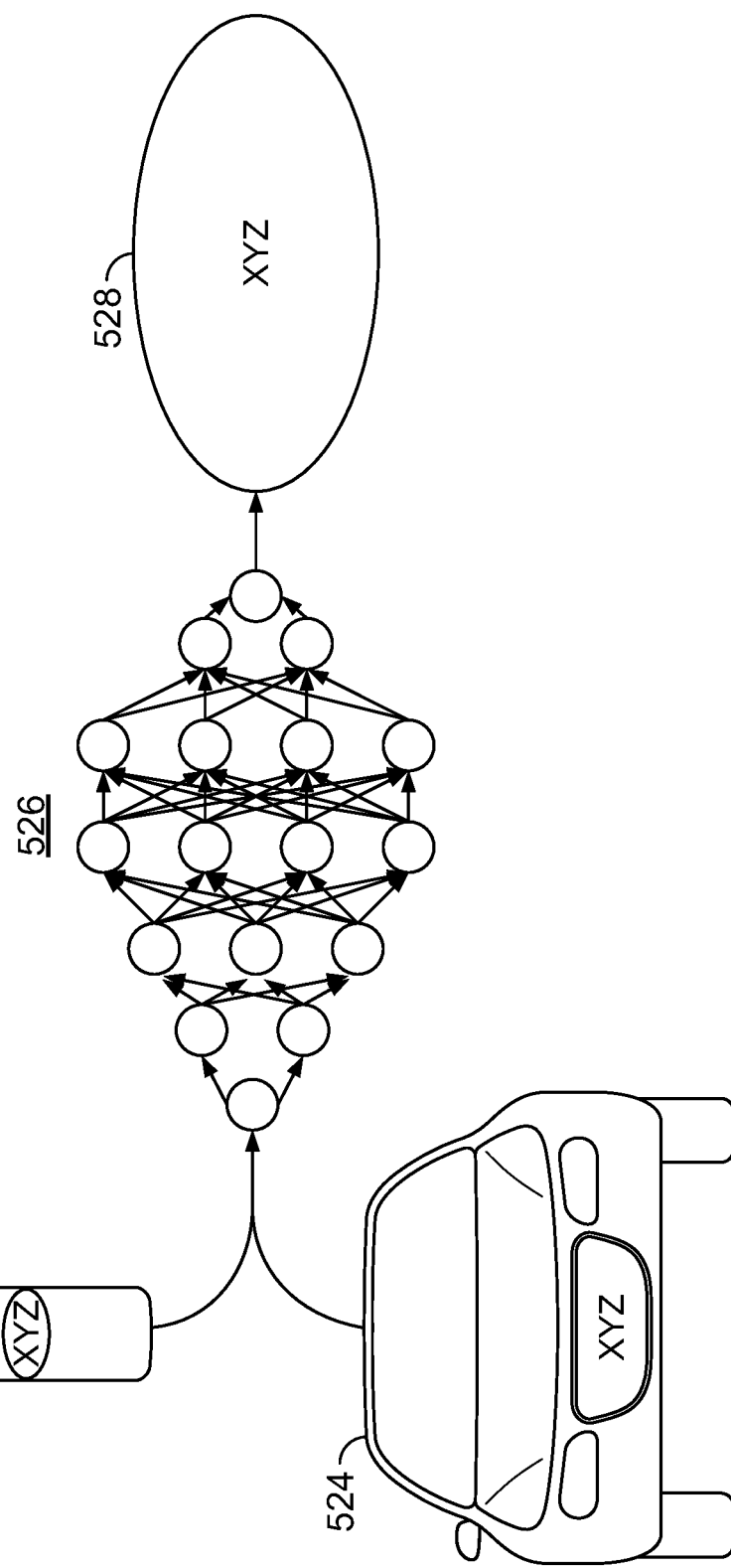

SYSTEM AND METHOD FOR INTELLIGENTLY GENERATING DIGITAL COMPOSITES FROM USER-PROVIDED GRAPHICS

FIELD OF TECHNOLOGY

The present application relates in general to the field of digital media compositing. In particular, the present disclosure is directed to a system and method for generating media overlays and integrating said overlays into digital media. This digital media may be provided to consumers through various services, including over-the-top (OTT) delivery systems.

BACKGROUND

Developments among digital media delivery systems have provided many opportunities for growth in the related technological fields, including linear service providers, VOD platforms, and other media content delivery networks, such as over-the-top (OTT) delivery systems. OTT delivery, a method used to go "over" a cable box to give users access to media content, has been an increasingly popular implementation for digital media distribution over the internet.

Because OTT provides high-bandwidth content over the internet, many additional features may be added to delivery systems to enhance both the consumer experience and analytical applications. Many OTT systems have provided advanced data analytics features for tracking consumers and understanding the macro-habits thereof. For example, more consumer data may be gathered and further analyzed using the metadata provided by an OTT device (e.g., computer, mobile device) and information provided by the consumer (e.g., consumer interests, hobbies). Small features for enhancing the consumer experience exist; however, these features may prove difficult to scale. One such example of unscalable features includes compositing and further integrating personal digital media alterations onto OTT content. Applying personal composites onto widely distributed digital content can prove difficult for many reasons, one being that each personal composite may be different between consumers and needs to be applied individually for each consumer. Each composite generally requires a visual effects artist to manually paint the brand onto the OTT content using a graphical user interface (GUI). Applying custom composites onto widely distributed digital content can also prove difficult because one must manually identify each composite opportunity within the content.

Therefore, the need exists for an automated, scalable system to provide an enhanced consumer experience without requiring an artist for every single custom composite. For example, this automated, scalable system may be able to apply personal composites to digital content based on each consumer's data. In order to accomplish such a task, this system will need to automate many processes, including the detection of opportunities for alterations to be applied to digital content and, ultimately, the compositing of digital media. It would also be beneficial to provide a quick and easy method to preview such compositing and, in an effort to promote utility of such a system, provide digital media clients with the opportunity to push composites onto digital content after approving said preview. Any numbers provided in the detailed description or Figures are provided for illustrative purposes only and do not limit the scope of the claims.

SUMMARY

Briefly, and in general terms, various embodiments are directed to the field of automated digital media compositing and the systems and methods related thereto.

According to one embodiment, the system as provided in the present disclosure may include an automated identification module. This automated identification module may execute a custom Automated Placement Opportunity Identification (APOI) engine. This APOI engine may be used to tag and/or label content based on visual features. According to some embodiments, the visual features being identified may include flat surfaces, locations, particular objects, scenery characteristics, etc. The APOI engine may incorporate one or more neural networks for detecting individual shots of a digital media set, generating labels associated with the visual features identified in each shot, and determining objects of interest that are mapped across the individual shots. The APOI engine and the one or more neural networks therein may be trained by analyzing labels generated in the past and confirmed as accurate.

The system as provided in the present disclosure may further include a Placement Insertion Interface (PII) system that allows digital media clients to easily explore available placements for composites to be inserted throughout available digital media. This PII system may further include an upload tool for digital media clients to upload their own visual assets to be composited.

The system as provided in the present disclosure may also include an automated compositing service, according to some embodiments. This automated compositing service may automate the integration of composites onto digital media in a programmatic manner. The automated compositing service may analyze digital media provided by a digital media client to identify areas of interest for inserting thereto a creative graphic. According to some embodiments, areas of interest may include flat surfaces, common objects, text, or other data as presented in the digital media. According to some embodiments, the creative graphic may include a logo or product intended for insertion into the areas of interest of the digital media. Dimensions of the creative graphic or the features provided therein may be altered in order to fit, replace, or otherwise composite onto the area of interest as identified in the digital media, according to some embodiments.

The automated compositing service as provided by the present disclosure may further include combining a base layer image and an insert layer image to form a composite image. According to some embodiments, the combining as performed by the automated compositing service may include adding one or more layers to the base layer image, such as a creative graphic layer, an alpha layer, a shadow layer, a reflection layer, among others. The automated compositing service may further include inserting or otherwise applying to the composite image a one or more effects, such as adding motion blur to a video, adding depth of field blur to composites intended to be viewed out of focus, and color correction effects for creating the illusion that all of the composited layers appear genuine in the scene.

Furthermore, the system as provided in the present disclosure may further include a preview system that allows digital media clients to quickly preview demo composites. The preview system may use standard media assets rather than the custom creative asset(s) of digital media clients, according to some embodiments. According to other embodiments, the preview system may use custom creative asset(s) of digital media clients, as well as other uploaded or otherwise provided assets.

The preview system as provided in the present disclosure also allows digital media clients to push composites, whether predetermined or dynamically generated, onto digital content after approving said preview, according to some embodiments. Pushing composites may require additional steps before execution, including but not limited to, bidding by way of a highest bidder auction. Furthermore, pushing composites may include generating a fully rendered composite into digital media assets as provided by the digital media clients.

According to some embodiments, the present disclosure provides for a method of and a system for pre-processing digital media, the system executing the method comprising: receiving a digital media dataset; detecting, by way of one or more neural networks, one or more shots within the digital media dataset, wherein each shot is identified by way of boundary indicators; generating, by way of the one or more neural networks, contextual labels for each shot, wherein each contextual label correlates to a characteristic of each respective shot of the digital media dataset; extracting an array of images for each shot, wherein one or more images of the array comprise one or more objects of interest; detecting, by way of the one or more neural networks, objects of interest for each image of the array of images of each shot; determining, by way of the one or more neural networks, objects of interest to be mapped; mapping, by way of the one or more neural networks, an object of interest of a first image of the array of images of a first shot to an object of interest of a second image of the array of images of the first shot, wherein the object of interest of the first image and the object of interest of the second image are labelled as an object of interest of the entirety of the first shot; mapping, by way of the one or more neural networks, the object of interest of the first shot to an object of interest of a second shot, wherein the object of interest of the first shot and the object of interest of the second shot are labelled as an object of interest of the entirety of the digital media set; and generating an output file comprising the digital media dataset and the associated labels therein.

According to some embodiments, the boundary indicators may include shot-by-shot animations, including one or more of the following: black screens, rapid pixel deltas, dissolving animations, and fading animations. According to some embodiments, determining objects of interest to be mapped comprises: determining matching objects of interest between two or more images of the array of each shot that meet a predetermined similarity threshold; and marking the matching objects of interest as objects of interest to be mapped. According to some embodiments, the present disclosure further comprises: generating, by way of the one or more neural networks, contextual labels for each shot, wherein each contextual label correlates to a characteristic of each respective shot of the digital media dataset. According to some embodiments, the generating contextual labels is handled in a prioritized order according to a first priority set of characteristics and a second priority set of characteristics. According to some embodiments, the first priority set of characteristics comprises visually flat surfaces. According to some embodiments, the second priority set of characteristics comprises one or more of the following: common objects visually present within the digital media dataset; text visually present within the digital media dataset; categorical data representative of the scene as presented in the digital media dataset; and audio data comprising recognizable speech provided in the digital media dataset. According to some embodiments, the one or more neural networks are at least partially trained on data manually labelled by a human user.

According to some embodiments, the present disclosure provides for a method of and a system for digital image composition, the system executing the method comprising: receiving a primary image asset comprising a plurality of areas of interest; automatically identifying first and second ones of the areas of interest to include in a composite image; receiving a secondary image asset comprising one or more features of interest; automatically identifying a first one of the features of interest to include in the composite image; and generating the composite image by combining at least a portion of the primary image asset that includes the first and second areas of interest with at least a portion of the secondary image asset that includes the first feature of interest, wherein the combining comprises compositing the at least a portion of the secondary image asset and the at least a portion of the primary image asset.

According to some embodiments, automatically identifying the first area of interest comprises: extracting, by way of one or more neural networks, characteristics of the primary image asset, the characteristics representative of visually flat surfaces located at a particular location in the primary image asset; generating a confidence value for each of the characteristics of the primary image asset; determining a best characteristic, wherein the best characteristic comprises a highest one of the confidence values; and labelling, by way of the one or more neural networks, the particular location associated with the best characteristic as the first area of interest. According to some embodiments, automatically identifying the second area of interest comprises: extracting, by way of one or more neural networks, characteristics of the primary image asset, the characteristics indicative of a particular location in the primary image asset; generating a confidence value for each of the characteristics of the primary image asset; determining a best characteristic, wherein the best characteristic comprises a highest one of the confidence values; labelling, by way of the one or more neural networks, the particular location associated with the best characteristic as the first area of interest. According to some embodiments, the characteristics of the primary image asset include one or more of the following: common objects visually present within the primary image asset; text visually present within the primary image asset; categorical data representative of the scene as presented in the primary image asset; and audio data comprising recognizable words or speech provided with the primary image asset. According to some embodiments, automatically identifying the first feature of interest comprises automatic logo identification as provided by one or more neural networks. According to some embodiments, creating the composite image further comprises manipulating dimensions of the composited image assets to match a predetermined output dimension. According to some embodiments, the primary image asset is indicative of a digital video asset comprising a series of image assets, wherein the method is programmatically repeated for each image asset of the series. According to some embodiments, each series of image assets are extracted from a digital video asset by: receiving the digital video asset; processing, by way of one or more neural networks, pixels of the digital video asset; identifying, by the one or more neural networks, a first shot boundary of the digital video asset and a second boundary of the digital video asset; extracting one or more video frames located between the first shot boundary and the second shot boundary of the digital video asset; and generating a series of image assets from the one or more video frames as extracted.

According to some embodiments, the present disclosure provides for a method of and a system for digital image composition, the system executing the method comprising: receiving as input a base layer image and an insert image; identifying a base layer area in the base layer image for placing the insert image; creating an insert layer image having dimensions corresponding to dimensions of the base layer image, wherein the insert layer image comprises the insert image placed within an insert layer area in the insert layer image corresponding to the base layer area; and combining the base layer image and the insert layer image to form a composite image.

According to some embodiments, the base layer image comprises a frame of a video. According to some embodiments, the base layer area comprises a surface of an object depicted in the base layer image. According to some embodiments, the insert layer image further comprises a transparent area surrounding the insert layer area. According to some embodiments, the present disclosure further comprises modifying the insert image to fit within the base layer area. According to some embodiments, the present disclosure further comprises creating an alpha layer image having dimensions corresponding to dimensions of the based layer image, wherein the alpha layer image comprises a cut-out or an application area corresponding to the insert layer area for applying additional effect layers thereto. According to some embodiments, the present disclosure further comprises determining that a first object depicted in the base layer image appears closer than a second object within the base layer area, and wherein the combining comprises depicting at least a portion of the first object in front of the insert image in the composite image. According to some embodiments, the present disclosure further comprises creating a shadow layer image comprising one or more shadows of one or more objects depicted in the base layer image, wherein the one or more shadows are disposed within the insert layer area. According to some embodiments, the combining comprises blending the shadow layer image with the composite image. According to some embodiments, the present disclosure further comprises creating a reflection layer image comprising one or more reflections of one or more objects depicted in the base layer image, wherein the one or more reflections are disposed within the insert layer area. According to some embodiments, the combining comprises blending the reflection layer image with the composite image. According to some embodiments, the present disclosure further comprises adding motion blur to the insert image within the insert layer area to simulate motion over a period of time. According to some embodiments, the present disclosure further comprises adding depth of field blur to the insert image within the insert layer area to simulate a difference in focus. According to some embodiments, the present disclosure further comprises generating respective composite images for a sequence of base layer images corresponding to frames in a video using the insert image.

Each of the features and teachings disclosed herein can be utilized separately or in conjunction with other features and teachings to provide a fully functional system that automates and scales digital media composite integration. Representative examples utilizing many of these additional features and teaching, both separately and in combination, are described in further detail with reference to the attached figures. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

Other features and advantages will become apparent from the following detailed description, taken in conjunction with the accompanying drawings, which illustrate by way of example, the features of the various embodiments.

BRIEF DESCRIPTION OF THE DRAWINGS

The foregoing will be apparent from the following more particular description of example embodiments of the invention, as illustrated in the accompanying drawings in which like reference characters refer to the same parts throughout the different views.

FIG. 5C illustrates an exemplary area selection optimization procedure, according to some embodiments.

DETAILED DESCRIPTION

Figure 1:
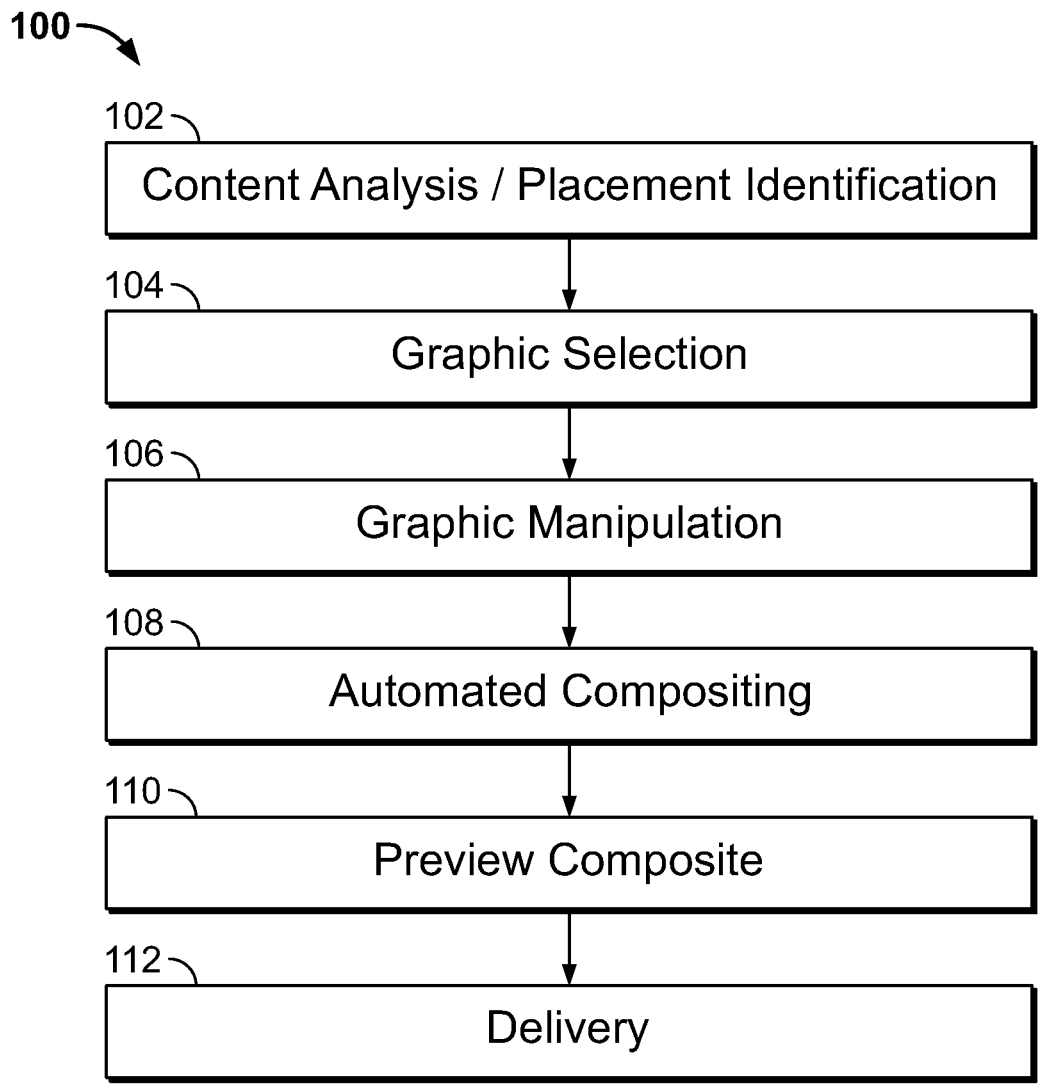
FIG. 1 illustrates a flowchart of the main components of the present disclosure, according to some embodiments.

The following disclosure provides many different embodiments, or examples, for implementing different features of the subject matter. Specific examples of components and arrangements are described below to simplify the present disclosure. These are merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

In the description below, for purposes of explanation only, specific nomenclature is set forth to provide a thorough understanding of the present disclosure. However, it will be apparent to one skilled in the art that these specific details are not required to practice the teachings of the present disclosure.

With the rise of Over the Top (OTT) media distribution systems, the amount of data being retrieved, transmitted, and further processed and/or altered is continuously growing.

Due to this increase in data growth, machine learning or neural network systems may be beneficial to the implementation of automated placement opportunity identification engines. As such, disclosed herein are exemplary embodiments of systems and methods for facilitating an automated placement opportunity identification engine using machine learning. The system may actively employ numerous machine learning methods, including neural networks, working in tandem to process input data and identify placement opportunities within digital media.

These machine learning methods as described above may be used in various stages along a data flow. For example, a neural network may be used as a pre-processing mechanism for other neural networks.

FIG. 1 illustrates a flowchart of the main components of the present disclosure presented for demonstrative purposes only, according to some embodiments. The main components of the present disclosure may include content analysis for placement identification at 102. According to some embodiments, placement identification may include identifying a placement video for placement opportunities as described below.

The main components of the present disclosure may further include selecting a graphic at 104. Graphic selection 104 may include selecting a pre-uploaded or previously available graphic for compositing into a placement video. Graphic selection 104 may further include uploading a new graphic by way of a Graphical User Interface displayed to a user. Graphic selection 104 allows a user to select which graphic is desired for compositing.

The main components of the present disclosure may further include manipulating the desired graphic in order to best fit the placement video at 106. This process may include manipulation of the graphic by a programmatic process or manually adjusted in order to alter the rotation, skew, and/or color of said graphic to more closely resemble the placement video, according to some embodiments. Some embodiments may further include manipulating the graphic using one or more of a compositing or combination procedures. These procedures may be used to generate a manipulated graphic based on a combination of graphics, logos, texts, or other creatives provided or otherwise indicated by the user. Alternatively, these procedures may generate the manipulated graphic according to instructions determined or otherwise calculated by the system without instruction from a user.

The main components of the present disclosure may further include compositing the manipulated graphic onto a placement location of the placement video at 108. According to some embodiments, compositing procedure at 108 may include a predetermined, programmatic methodology or automated process as indicated in FIG. 1.

The main components of the present disclosure may further include displaying for the user a preview of the manipulated graphic composited onto the placement location of the placement video at 110. Preview procedure at 110 may include generating a graphical user interface that displays for the user a generated preview, according to some embodiments.

The main components of the present disclosure may further include delivering to the user a final output video comprising the manipulated graphic composited onto the placement location therein as shown at 112. Delivery procedure at 112 may include delivering the final output video by way of a communication protocol designed for file transfer, such as the IP protocol suite (e.g., TCP, UDP, FTP), or any other digital delivery method.

Automated Placement Opportunity Identification

Compositing images onto digital media may be implemented through numerous steps as provided by the present system. According to some embodiments, the first step in order to implement the present system involves an Automated Placement Opportunity Identification engine. The Automated Placement Opportunity Identification engine may use one or more machine learning algorithms to identify placement opportunities within digital media. According to some embodiments, placement opportunities may include flat surfaces such as billboards, walls, sides of buildings, tables and desks, counter tops and bars, screens (e.g., digital screens, computer screens, monitors, etc.), signage, and/or posters.

Figure 2:
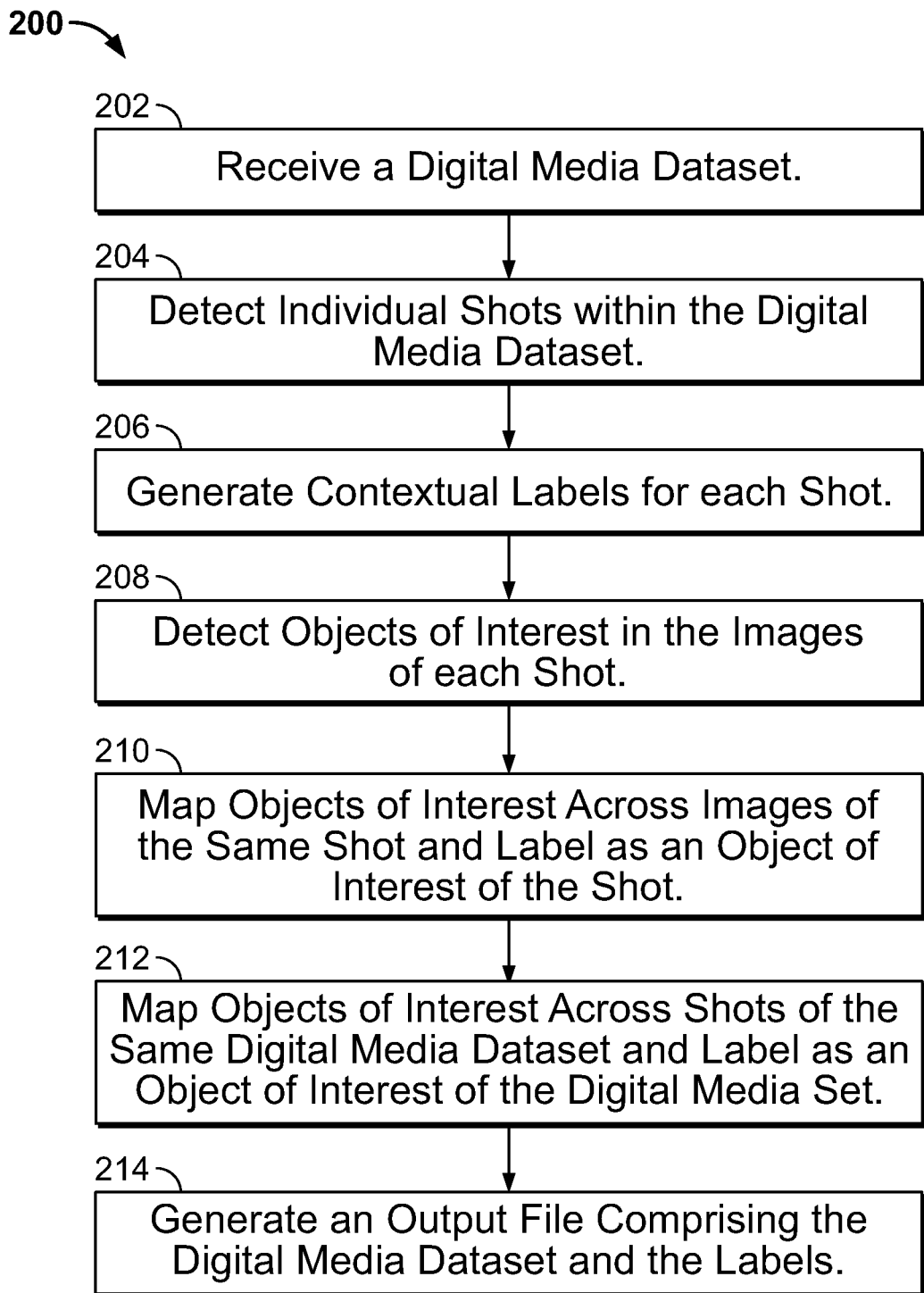
FIG. 2 illustrates an automated placement opportunity identification engine, according to some embodiments.

FIG. 2 illustrates an automated placement opportunity identification engine, according to some embodiments. The Automated Placement Opportunity Identification engine may receive a digital media dataset at 202, according to some embodiments. In order to identify the boundary (e.g., cuts, dissolves, fades) of a single shot, the Automated Placement Opportunity Identification engine may rapidly preprocess the digital media using a shot boundary detection mechanism at 204. The shot boundary detection mechanism may utilize a pretrained neural network model that receives as input the pixels of digital media and outputs final shot boundaries therefrom. This neural network may be fully convolutional in time, allowing it to use a large temporal context without continuously processing frames. More information regarding such a shot boundary detection mechanism is described in *Ridiculously Fast Shot Boundary Detection with Fully Convolutional Neural Networks* (Gygli, Michael, May 23, 2017), and is hereby incorporated as reference.

One or more neural networks may also be used to label the context of each shot at 206. This may be implemented by an engine for contextual recognition, according to some embodiments. The context recognition engine may implement one or more various neural networks (pre-trained or otherwise) to identify the context of a scene, environment, location, or other data used to describe the context of a particular media. The contextual labels may be used as input to one or more neural networks to identify objects of interest, including placement opportunities, at 208. Placement opportunities may include object type recognition (e.g., cars, computers, food, beverage, etc.), scene/contextual recognition (e.g., office, outdoors, mountains, home, kitchen, etc.), audio/speech recognition and categorization (e.g., subject of conversation/dialogue, keyword mapping, full transcriptions, etc.), and sensitive content (violence, nudity, alcohol, illicit drugs, etc.), according to some embodiments.

The Automated Placement Opportunity Identification engine may be implemented using various techniques. For example, according to some embodiments, the Automated Placement Opportunity Identification engine may incorporate pre-trained neural networks that have been trained using publicly available computer vision datasets (e.g., Imagenet). These neural networks may be trained using this public data to learn and identify different labels, each of which may be associated with a placement opportunity as described above.

The Automated Placement Opportunity Identification engine may further incorporate a transformation of pre-trained neural networks to more accurately represent the intended models, according to some embodiments. Transforming pre-trained neural networks may include re-training, layer manipulation, progressive mutations, recurrent training, or any other alterations to a publicly-available, pre-trained neural net model.

Furthermore, the Automated Placement Opportunity Identification engine may implement a custom neural net model that is trained by humans using a manual computer vision annotation tool, according to some embodiments. The computer vision annotation tool may allow a user to gather images for annotation. The user may then annotate and assign labels (e.g., using bounding boxes) to areas of the gathered images that the user identifies as placement opportunities. These labels are then used to train a custom neural net model for label identification purposes.

Further still, the Automated Placement Opportunity Identification engine may further implement an object tracking mechanism at 210, according to some embodiments. The object tracking mechanism may be used to match objects (e.g., placement opportunities) across various frames of a moving scene. The object tracking mechanism may further be used to identify objects across various camera angles of the same scene at 212. By estimating depth and 3D geometry from 2D frames, the object tracking mechanism may be able to identify placement opportunities, according to some embodiments.

Further yet, the Automated Placement Opportunity Identification engine may output, at 214, the digital media dataset, indications of placement opportunities, as well as the labels added thereto.

Compositing images onto still images may require a trivial amount of work. Analyzing a still image to detect availability for placing a composite image requires analysis of only one frame of a single image. Expanding this service to other media formats other than still images (e.g., video data) will benefit from further analysis and/or additional machine learning methods.

According to some embodiments, the Automated Placement Opportunity Identification engine may use the above placement opportunity data points in at least two ways. A first way that the placement opportunity data points may be used is as an auditing tool for use by a human to evaluate the identified placement opportunity to determine whether or not to proceed with compositing. This may be used to reduce labor costs of analyzing video data for placement opportunities.

Placement Insertion Interface System—Inventory Browsing Tool

The placement opportunity data points may be used in a search query to filter through the digital media available for compositing. The implementation of this search query may be used to identify many various aspects of a scene, including particular objects, scenery, dialogue category, presence of sensitive content, etc. This search query implementation may be integrated into a Placement Insertion Interface (PII) system as an inventory browsing tool.

Figure 3:
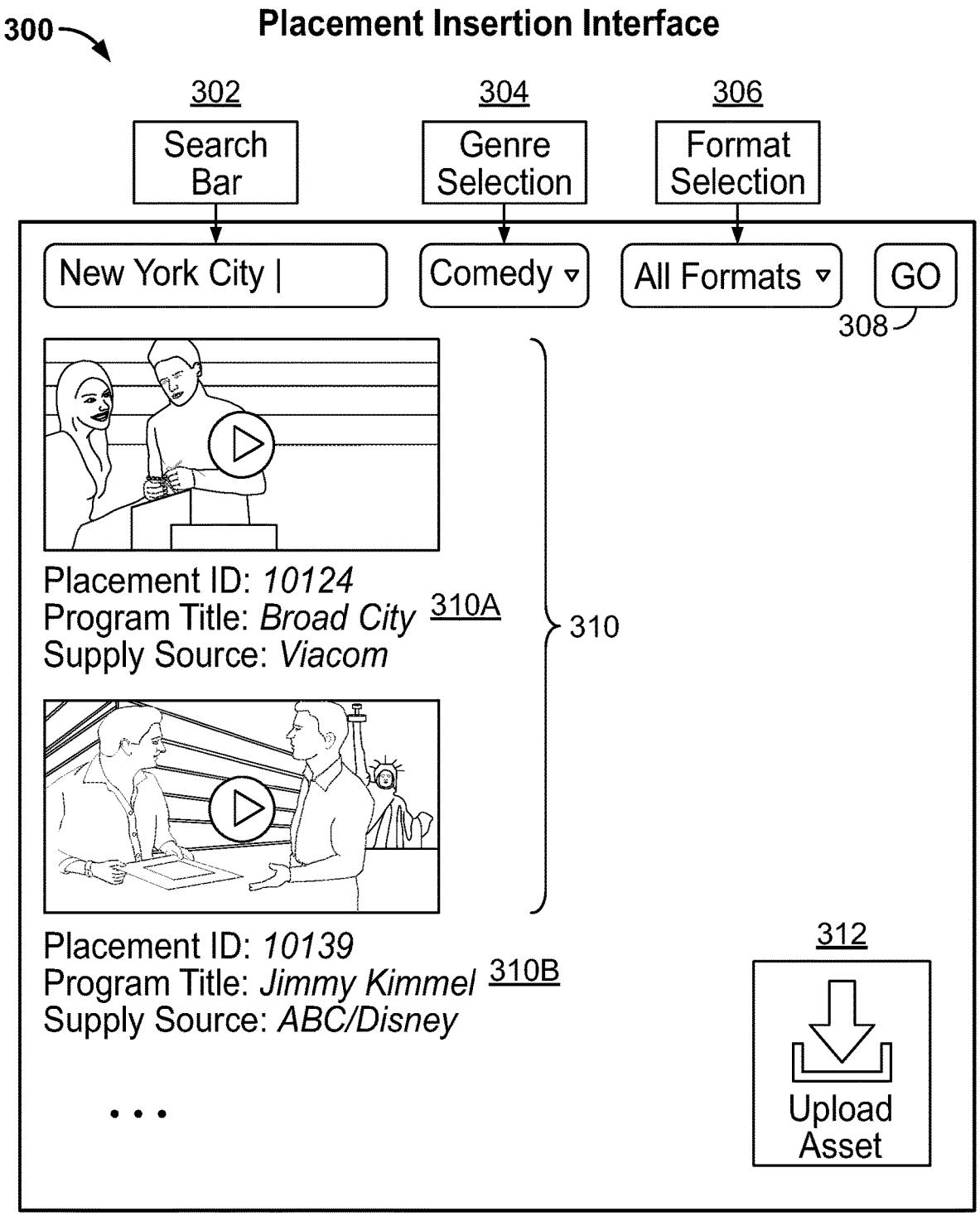
FIG. 3 illustrates GUI elements of a Placement Insertion Interface (PII) system, according to some embodiments.

FIG. 3 illustrates a placement inventory browsing tool 300 of a PII system, according to some embodiments. According to some embodiments, a user may use the placement inventory browsing tool to browse the inventory of digital media available to receive composites. This inventory may be organized by highly specific, individual placements of composites. This inventory may also be browsed by context as identified by the Automated Placement Opportunity Identification engine. Some embodiments may be browsed using other features as identified by the Automated Placement Opportunity Identification engine, the features including keywords, genres, formats, etc.

Placement inventory browsing tool 300 includes a graphical user interface that displays options for browsing through the inventory of digital media available to receive composites. For example, placement inventory browsing tool 300 includes a search bar utility 302, a genre selection utility 304, and a format selection utility 306. According to some embodiments, search bar utility 302 may receive keyword searches as shown in FIG. 3. Search bar utility 302 may also be a drop-down list, radio button, or any other graphical user interface element used to receive input, according to some embodiments. Genre selection utility 304 may receive one or more user selections from a drop-down list as shown in FIG. 3. Genre selection utility 304 may also be a search bar, radio button, or any other graphical user interface element used to receive input, according to some embodiments. Genre selection utility 304 may provide selections such as Comedy, Horror, Action, Reality, and many other genres. Further yet, according to some embodiments, format selection utility 306 may receive one or more user selections from a drop-down list as shown in FIG. 3. Format selection utility 306 may also be a search bar, radio button, or any other graphical user interface element used to receive input, according to some embodiments. Format selection utility 306 may provide selections such as In-Action Six, Overlay, Brand Insertion, Product Insertion, and many other formats.

The graphical user interface of placement inventory browsing tool 300 may further include a search button 308, shown as "GO" in FIG. 3. According to some embodiments, button 308 may be used to activate a search query. When selected, button 308 may fetch the query terms as provided by the user by way of GUI elements displayed on screen, such as search bar utility 302, genre selection utility 304, and format selection utility 306, according to some embodiments. Activation of search button 308 may further return results 310 based on a user's selections. For example, the search query as shown in FIG. 3 includes a keyword search for "New York City" in search bar utility 302. The search query as shown in FIG. 3 further includes comedy in the genre selection utility 304, and all formats in the format selection utility 306. The search query as shown in FIG. 3 returns at least two results 310: result 310A ("Broad City") and result 310B ("Jimmy Kimmel"). Each of the results 310 may include a preview of the clip, a placement ID number, a program title, and a supply source, according to some embodiments. For example, result 310A includes a placement ID number of 10124, a program title of "Broad City," and a supply source of "Viacom."

The graphical user interface of placement inventory browsing tool 300 may further include an upload button 312, shown as "Upload Asset" in FIG. 3. When selected upload button 312 may display for the user a graphical user interface whereby the user may upload his/her own digital media asset, according to some embodiments.

According to some embodiments, the returned results in response to activation of a search button 308 may be fetched from a supply database of placements. The video clips as previewed in results 310 may be activated by a play button shown in the center of the video clip, according to some embodiments. When activated, this play button may activate a fetching protocol in which a preview video clip may be fetched from a server that hosts actual video assets of the placement video clips returned as results. As such, activation of this play button may activate a preview of the video clip for the user's viewing, according to some embodiments. According to some embodiments, a preview of the video clip may provide completed composites previously rendered by other users. This may be done in order to show an example of how a composite looks when inserted into a particular video clip.

Figure 4:
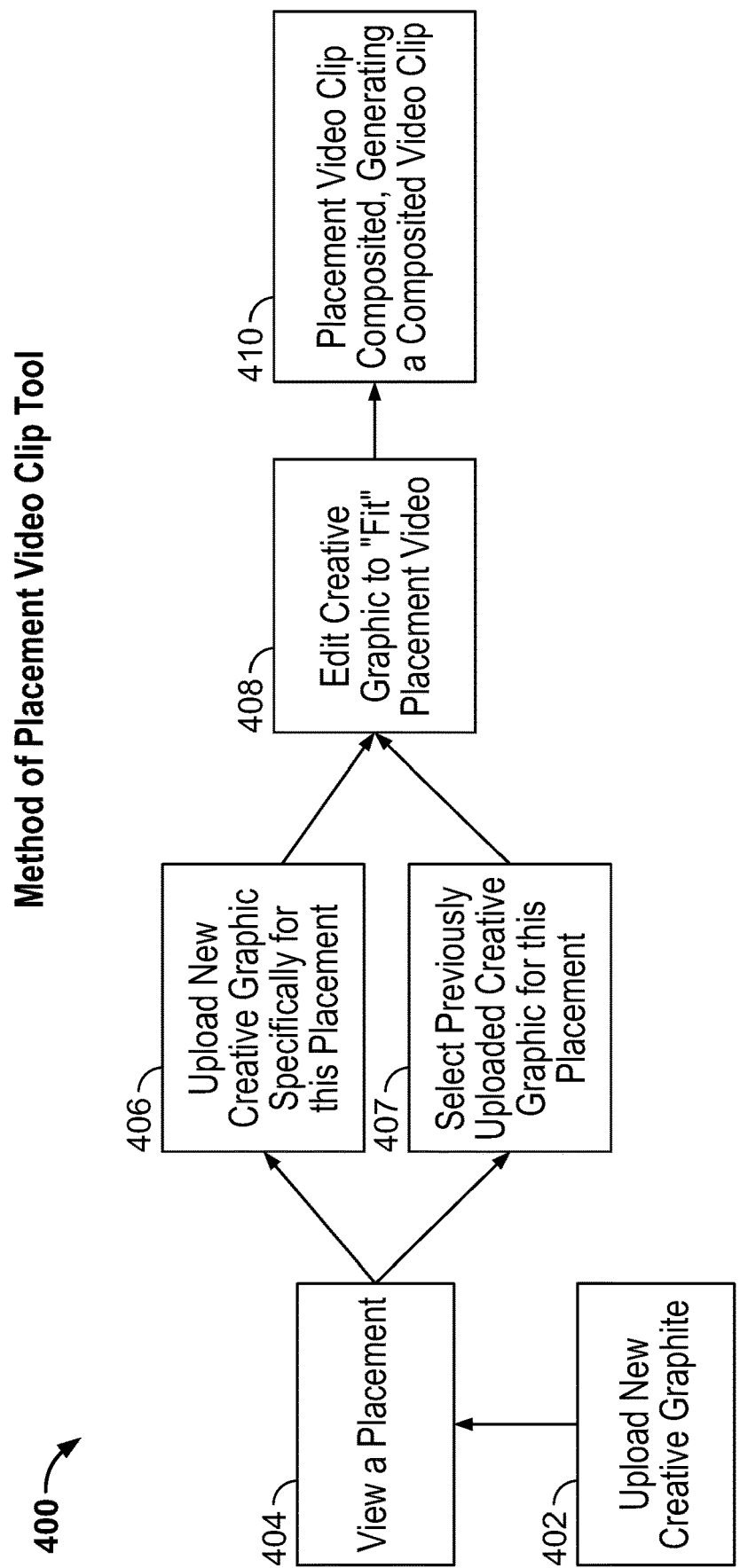
FIG. 4 illustrates a flowchart detailing the methods performable by a placement video clip tool, according to some embodiments.

FIG. 4 illustrates a placement video clip tool 400, which may allow users to setup new placement video clips (also known as pre-composited versions of a specific shot from a specific digital media content video). At 402, a user may be able to upload a new creative graphic, according to some embodiments. According to some embodiments, a user may then select a placement video clip to preview a creative graphic composited thereon as shown in FIG. 4 at 404. A user may also be able to simply select a placement video clip to preview without uploading a new creative graphic, according to some embodiments.

According to some embodiments, once a user selects a placement video clip, the user may then select a creative graphic to composite onto the selected placement video clip at 406. The creative graphic may be newly uploaded at 406 or, alternatively, select a previously uploaded creative graphic for the placement video clip at 407, such as the creative graphic uploaded at 402. According to some embodiments, a creative graphic may be uploaded either directly from a specific placement preview or from a distinct "upload" page. In either case, an uploaded creative can be inserted into any matching placements.

After selecting a creative graphic for compositing onto a previously-selected placement video clip, the creative graphic may be programmatically adjusted to best fit the placement within the placement video clip. According to some embodiments, this programmatic adjustment may be accomplished through computer vision, permutationary rendering, or any other rendering technologies to provide one or more "best fit" options to be selected by the user. The user may then select one of the "best fit" options. Accordingly, the user may then edit the creative graphic by way of creative graphic editing tools for manual adjustments to more closely fit the placement at 408. According to some embodiments, once the user has completed the editing process, a composited video clip will then be created and a preview rendering may be generated in order for the user to preview the composited video clip at 410.

Figure 5A:
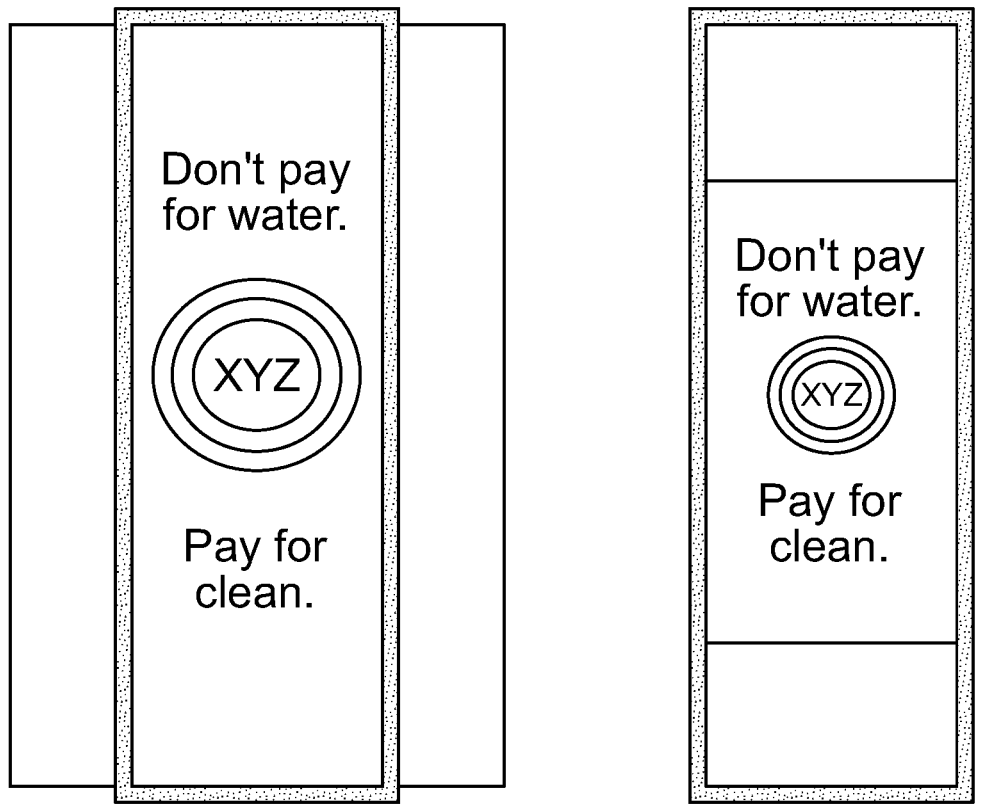
FIG. 5A illustrates various creative graphic fit placements, according to some embodiments.

FIG. 5A illustrates some "best fit" options that may be presented to a user as described above, according to some embodiments. The options may be presented in various ways by way of a user-interactive GUI, such as the GUI shown in FIG. 5. According to some embodiments, best fit options 500 may include a fill mode 502 and a fit mode 504, among others. Other best fit options may be presented to a user, such as "stretch to fit," "fit entirely," and even more advanced modes such as programmatic skewing to account for various angles presented in placement video clips. Further to selecting a "best fit" option, the present technology may further recognize the best area of a creative graphic to display in a particular placement video clip. For example, the present technology may include an area selection optimizer (ASO) engine, according to some embodiments.

Area selection optimizer (ASO) engine may be used to programmatically recognize the optimal area of a creative graphic to display within the placement area of a placement video. ASO engine may be used to identify various features that typically indicate the focus of a graphic and may, according to some embodiments, extract such a feature for insertion into a placement video. According to some embodiments, ASO engine may further include logo identification, intelligent cropping, and optimal resizing. For example, the ASO engine and APOI engine may implement a Guassian, machine learning, or otherwise computer vision algorithm to identify logos, faces, or other important features from a user's uploaded media or other media for use as a creative graphic. Similarly, the ASO engine and APOI engine may use computer vision algorithms to analyze the pixel colors, brightness, and intensity to select a region that is a local minima with respect to brightness, as well as large enough for placement of a creative graphic, such as a logo, text or other overlay of interest. A creative graphic provided by the user may be altered according to instructions determined by the ASO engine. The creative graphic may also include a combination of one or more creative graphics composited onto or otherwise combined with each other.

According to some embodiments, when a user uploads a creative graphic (e.g., 406) or selects a previously uploaded creative graphic (e.g., 407), ASO engine may be used to recognize the most important features or otherwise an optimal area of the creative graphic before editing (e.g., 408) the creative graphic. By recognizing the most important features of the creative graphic, the editing process may be programmatically enabled to include the features as recognized by the ASO engine. According to some embodiments, ASO engine may perform analytics on a creative graphic without altering or otherwise permanently changing the creative graphic. Alternatively, the ASO engine may perform analytics on a copy of the creative graphic in order to preserve the original creative graphic file. In doing so, once a creative graphic is uploaded to the present system, it may be repeatedly analyzed, copied, and/or manipulated for placement in an unlimited number of placement video clips. For example, if a user uploads a creative graphic for placement in a first placement video clip, the said creative graphic may be copied, analyzed, further placed into the first placement video clip, preserving a copy of the said creative graphic. A user may then analyze and further place the same creative graphic (or a copy thereof) preserved from the previous upload across any number of placement video clips in the future.

According to some embodiments, the ASO engine may use one or more machine learning algorithms to identify important features or otherwise an optimal area of the creative graphic to include in a placement video clip. Similar to the Automated Placement Opportunity Identification engine, the machine learning algorithms as applied herein may be trained using training data provided by successful manipulation and placements of creative graphics, according to some embodiments.

Some examples of important features identified by the ASO engine may include, but are not limited to, a face of an individual, faces of a group of individuals, a group of people more generally, a prominent object of interest provided in the creative graphic, multiple objects of interest as provided in the creative graphic, objects or people at the center of the frame or alternatively in focus as provided in the creative graphic, among others. Important features identifiable by the ASO engine may further include, according to some embodiments, logos, icons, emblems, marks, designs, logotype designs, or other unique symbols associated with a company, organization, group, or individual.

Figure 5B:
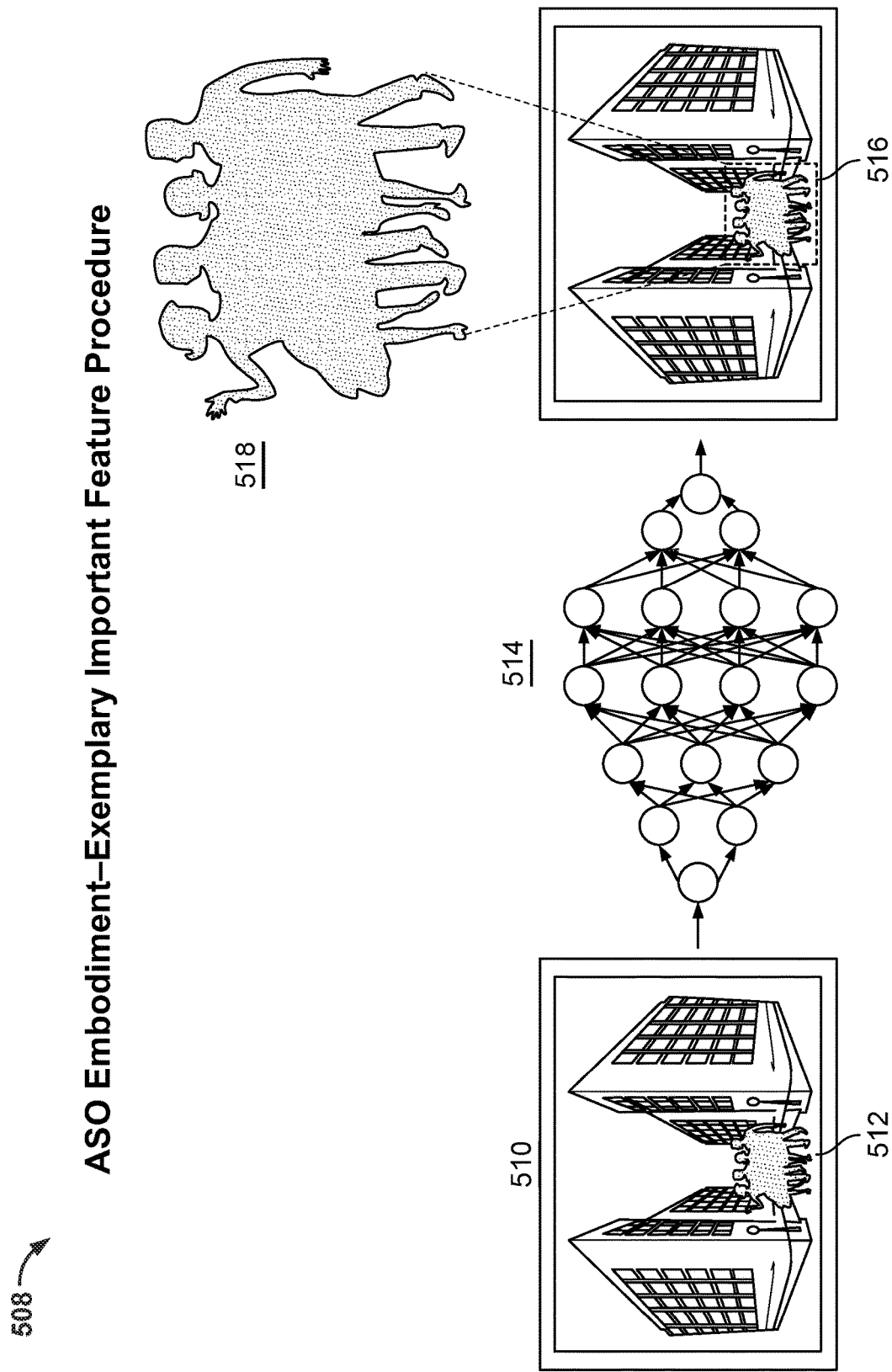
FIG. 5B illustrates an exemplary area selection optimization procedure, according to some embodiments.

FIG. 5B illustrates an exemplary area selection optimization procedure, according to some embodiments. Exemplary ASO procedure 508 may include receiving a creative graphic 510 to identify or otherwise extract an important feature therein. Creative graphic 510 may include therein one or more important features identifiable by an ASO engine. As shown by ASO procedure 508, creative graphic 510 includes features such as buildings, street lights, and a group of people 512. According to some embodiments, ASO engine 514 may be trained using training data including other creative graphics with pre-labeled important features. ASO engine 514 may receive creative graphic 510 to identify important features therein and label them accordingly. Labeling may include applying a bounding box or other notation to a portion of creative graphic 510 to indicate that an important feature may be located therein. For example, ASO engine 514 may determine that group of people 512 is an important feature of creative graphic 510 and apply thereto a label 516. According to some embodiments, ASO engine 514 may extract important features from creative graphic 510 (or a copy thereof) in addition to or instead of labeling. For example, ASO engine 516 may extract an identifiable feature 520 from creative graphic 510 (or a copy thereof) by eliminating therefrom features not identified as important by ASO engine 514 (e.g., buildings and street lights), leaving only an extracted group of people as the identified important feature 520.

FIG. 5C illustrates an exemplary area selection optimization procedure, according to some embodiments. Exemplary ASO procedure 520 includes receiving one or more creative graphics to identify or otherwise extract a logo or icon therefrom. ASO procedure 520 demonstrates ASO engine 526 receiving two different creative graphics, such as bottle graphic 522 and automobile graphic 524, both of which have a logo contained therein. According to some embodiments, ASO engine 526 may be the same ASO engine 516 as described in ASO procedure 510 trained using training data similar to that of ASO engine 516 along with additional training data. Alternatively, ASO engine 526 may be separate from ASO engine 516. According to some embodiments, ASO engine 526 may be trained using training data including other creative graphics with pre-labeled logos contained therein. For example, ASO engine 526 may receive bottle graphic 522 for analysis, identifying and further extracting an important feature, such as logo 528, therefrom. Similarly, ASO engine 526 may receive a different graphic for analysis, such as automobile graphic 524, to identify and further extract an important feature, such as logo 528, therefrom. ASO engine 526 may extract important features (e.g., logo 528) from a creative graphic (e.g., bottle graphic 522, automobile graphic 524) irrespective of what the creative graphic displays.

Automated Compositing Job Processing

Figure 6:
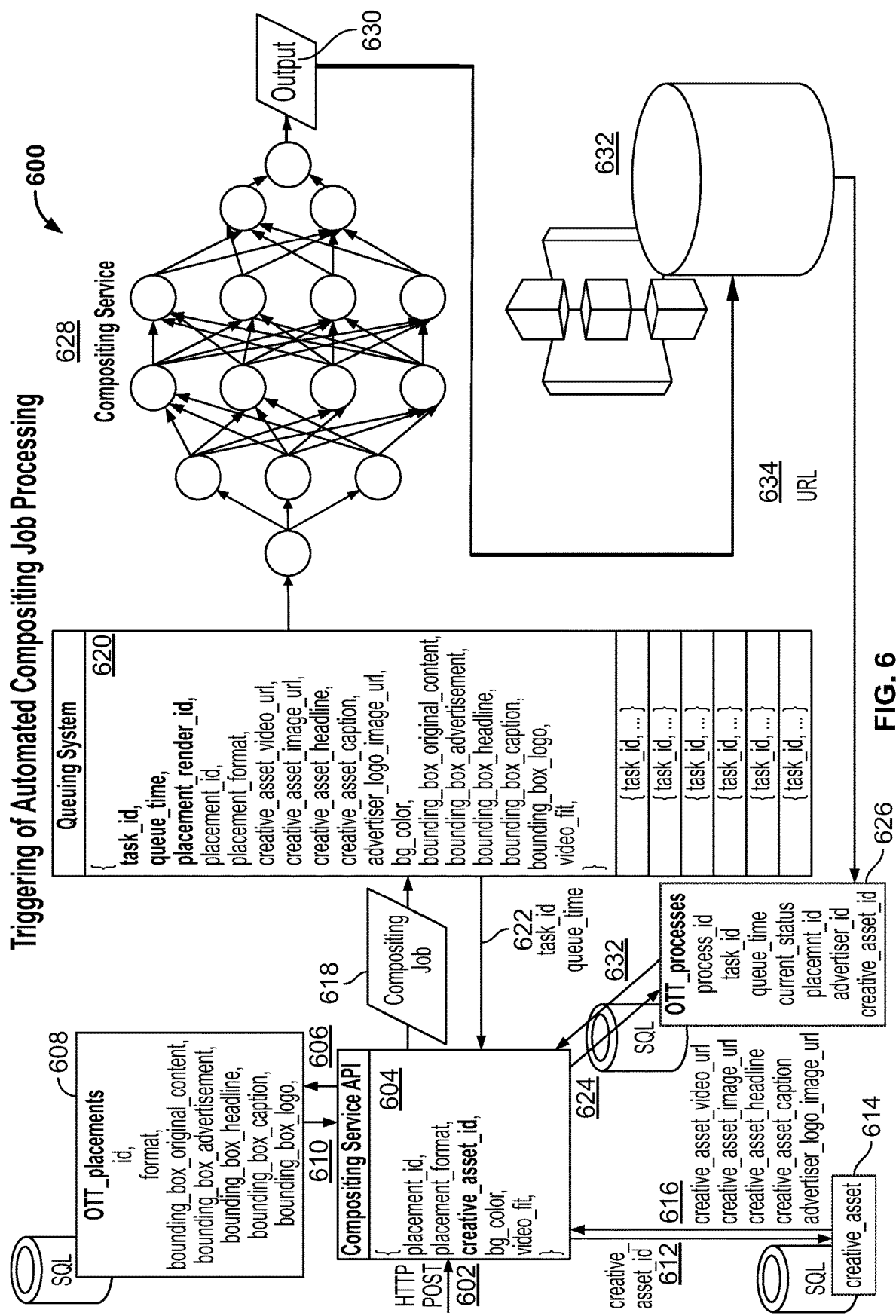
FIG. 6 illustrates the events that precede and succeed an automated compositing service, according to some embodiments.

FIG. 6 illustrates the events that precede and succeed an automated compositing service, according to some embodiments. After the creation of a new placement video clip or the uploading of a new creative, an HTTP request may be triggered at 602. This HTTP request at 602 may transmit information by way of a compositing service API. This information may include, but is not limited to the following data: placement ID, placement format number, creative asset ID, BG color, and video fit. Placement format number may include one or more of the following:

1. In-Action Six
2. Overlay
3. Brand Insertion.

Similar to the video fit selections as described above, the video fit options may include, but are not limited to "stretch fit" or "fit entirely." According to some embodiments, HTTP request at 602 may be an automated scheduled job that continually checks for newly uploaded creative graphics.

The Compositing service API 604 as shown in FIG. 6 may query database tables to gather more information and assets that the compositing job may need, such as those indicated or otherwise requested by HTTP post 602. According to some embodiments, compositing service API 604 may transmit a query request 606 to a first database table, OTT placements table 608. In response to query request 606, OTT placements table 608 may transmit a response 610 containing bounding box coordinates that specify the positions of video and creative assets in the composited output. The coordinates transmitted at response 610 may be static or otherwise dynamic for the duration of the placement video clip.

According to some embodiments, compositing service API 604 may further transmit a query request 612 to a second database table, creative assets table 614. In response to query request 612, creative assets table 614 may transmit a response 616 containing a creative ID to get the public URLs of the actual creative graphics (e.g., images, GIFs, video), as well as a headline and caption.

After fetching the above information, compositing service API 604 may generate a compositing job using information received from responses 610 and 616, among other data. Compositing service API 604 may further transmit compositing job 618 as a queue request into queuing system 620. Compositing job 618 may contain data gathered by compositing service API 604, including one or more of: placement ID(s), format number(s), creative asset ID(s), video fit type(s), compositing variables, original content clips, and a combination thereof, among other data. Compositing variables may include, but are not limited to, bounding boxes and background colors, among others. According to some embodiments, queuing system 620 may transmit a response 622 to compositing service API 604, response 622 including a task ID and a queue time, among others. Data received by compositing service API 604 from responses 610, 616, and 622 may be transmitted to and stored in composite processes database table 626 for later reference or retrieval.

Compositing job 618 be stored at queueing system 620 until it is passed into compositing service 628, shown as a complex web of logic nodes. Compositing service 628 will be further described below. The output 630 of compositing service 628 may be a composited version of the original placement video clip, according to some embodiments. The name of output 630 may use a variety of naming conventions, including those based on the placement video ID. According to some embodiments, output 630 of compositing service 628 (e.g., composited version of the original placement video clip) may be uploaded to composite directory 632 and stored with a render ID for later use. When uploaded, the naming convention of output 630 may be used to generate an access URL 634 for storage and later retrieval at composite processes database table 626 for later reference and retrieval. For example, compositing service API 604 may query composite processes database table 626 to receive a response 632 containing access URL 634. Rather than regenerating a new composite output, compositing service API may use the access URL 634 to fetch and reuse the already composited output 630 from composite directory 632.

Automated Compositing Service

The Automated Compositing service as described above may encompass generating at least four OTT formats:

1. In-Action Six format
2. Overlay format
3. Brand Insertion format
4. Product Insertion format.

The In-Action Six format may be used to composite a second video into a small portion of the frame while a first video is shrunk into another small corner of the same frame. The Overlay format may be used to simply overlay a second video onto the corner of a first video. The Brand Insertion format may be used to realistically composite still images into a scene of a video. Lastly, the Product Insertion format may be used to composite 3D objects into a scene of a video. Both the In-Action Six format and the Overlay format may be considered on-top compositing, while the Brand Insertion format and Product Insertion format may be considered compositing into the scene.

On-Top Compositing Logic

Figure 7:
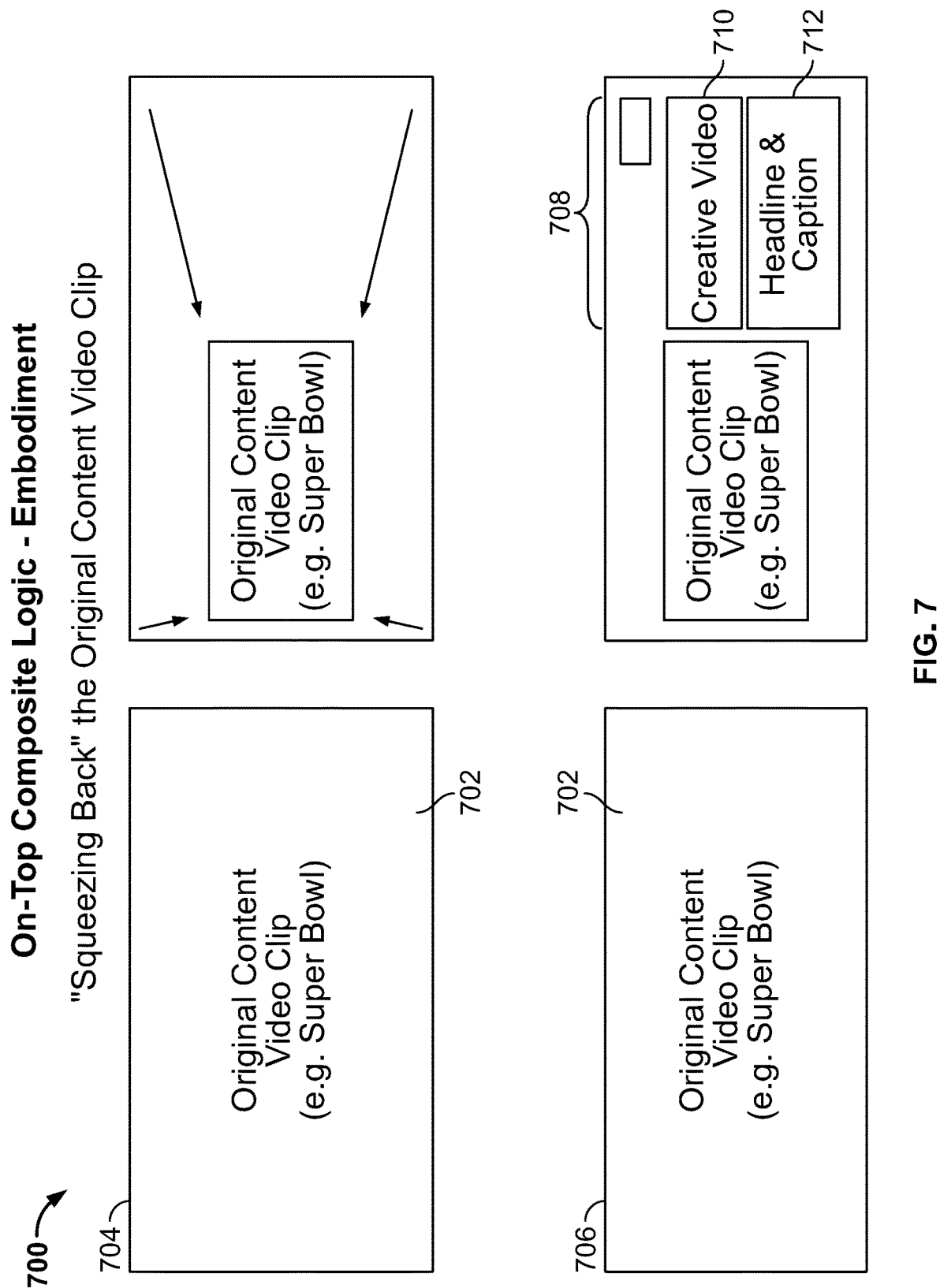
FIG. 7 illustrates an on-top composite logic process, according to some embodiments.

In-Action Six and Overlay composites use on-top compositing logic in order to generate their respective outputs. According to some embodiments, FIG. 7 illustrates an on-top composite process, specifically an in-action six compositing logic 700. For example, a Super Bowl video stream could be used as the original content video clip 702 as shown in FIG. 7. The original content video clip 702 may be shrunk into a smaller portion of the frame as shown as "Squeezing Back" at 704. At 706, given an original content video clip 702 and creative content 708, the original content video clip 702 squeezes back from filling the full screen to at least a partial portion of the screen. Specifically, according to some embodiments, original content video clip 702 is confined by the original content bounding box detailed by the compositing variables (e.g., bounding boxes, background colors, etc.) as described above.

According to some embodiments, creative content 708 may include one or more of the following: a creative video clip 710 and a headline & caption 712. Creative video clip 710 may be confined by a bounding box as shown in FIG. 7. At 706, creative content 708 may fade onto the screen at various places and sizes, according to some embodiments. This fading process at 706 may be described as a sliding gradient from 0% opacity to 100% opacity within a predetermined time frame (e.g., 2 seconds). Creative content 708 may or may not be dynamic, according to some embodiments. Static and dynamic content may be displayed by creative content 708, according to some embodiments.

According to some embodiments, after creative video 710 has finished playing, original content video clip 702 scales back to 100% of the frame size. According to other embodiments, if creative content 708 is static, for example, the original content video clip 702 may scale back to 100% of the frame size after a predetermined period of time (e.g., 6 seconds).

The compositing process used to accomplish such a scaling effect of the original content video clip 702 and the insertion of creative content 708 may be described as the on-top compositing logic. According to some embodiments, this on-top compositing logic may utilize the following elements:
- Animating the position of original content video clip 702 as shown at 704;
- Animating the scale of original content video clip 702 as shown at 704;
- Compositing a static or dynamic creative video clip 710 of creative content 708 at positions and scale defined by a bounding box and by a default logo position as shown at 706;
- Generating text (e.g., headline and caption 712) to display within creative content 708 using a predetermined font and text size as shown at 706; and
- Animating the opacity of all content being actively displayed as shown at 706 (e.g., original content video clip 702, creative content 708, creative video clip 710, headline and caption 712, etc.).

Similarly, the following variables are used to achieve on-top compositing logic, specifically in-action six compositing logic:
- Bounding box (x, y, w, h) for a creative video clip, such as creative video clip 710;
- Bounding box (x, y, w, h) for creative content, such as creative content 708;
- Bounding box (x, y, w, h) for headlines and captions, such as headline and caption 712;
- Video format number as previously gathered by compositing service API 604 above;
- Background color; and
- Text fonts.

Figure 8:
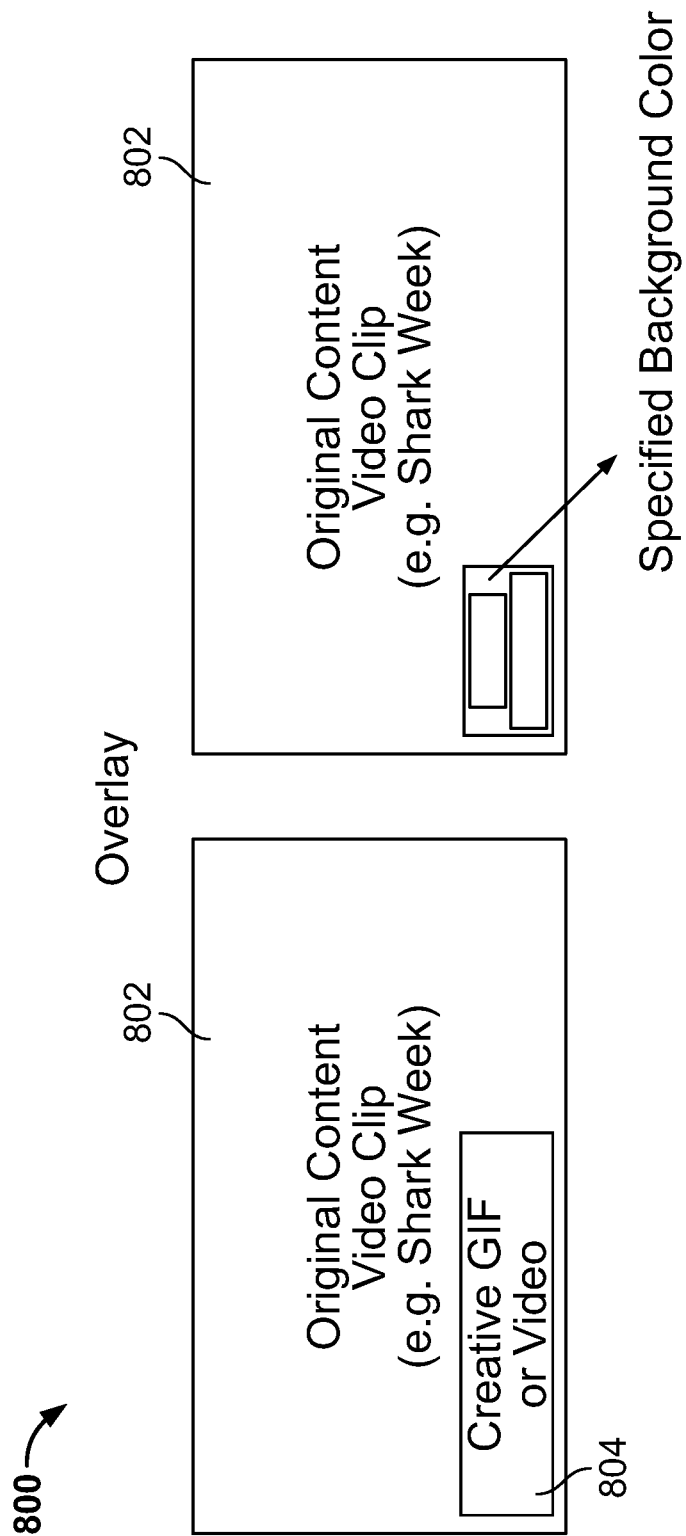
FIG. 8 illustrates an on-top composite logic, according to some embodiments.

According to some embodiments, another format that uses on-top composite logic may include an overlay format. According to some embodiments, FIG. 8 illustrates an on-top composite process, such as overlay logic 800. For example, a shark week video stream could be used as the original content video clip 802 as shown in FIG. 8. Given an original content video clip 802 and creative content 804, the creative content 804 is confined by the original content bounding box detailed by the compositing variables (e.g., bounding boxes, background colors, etc.) as described above. Creative content 804 may include a dynamic or static creative video clip (e.g., a creative GIF, video, or static image). Creative content 804 may be confined by a bounding box as shown in FIG. 8. Furthermore, creative content 804 may further comprise a pre-specified background color, headlines and captions, among other information, according to some embodiments. FIG. 8 shows creative content 804 in the lower third of the original content video clip 802. According to some embodiments, the creative content 804 fades in from 0% opacity to 100% opacity on top of the original content video clip 802.

At least two distinctions arise between In-Action Six composite logic and Overlay logic:

1. Overlay format logic contains the creative content composited onto the original content video clip to a single bounding box in at least some portion of the screen; and 2. Overlay format logic may not necessarily display all of the creative content on the screen at the same time. For example, a first creative content may dissolve in and then dissolve out. Then, after the first creative content is dissolved out, a second creative content, such as a logo, may dissolve in.

Similarly, the following variables are used to achieve on-top compositing logic, specifically overlay compositing logic:
- Bounding box (x, y, w, h) for a creative content, such as creative content 804;
- Bounding box (x, y, w, h) for headlines and captions, such as the headline and caption as shown in FIG. 8;
- Video format number as previously gathered by compositing service API 604 above;
- Background color as shown in FIG. 8; and
- Text fonts.

In-Scene Compositing Logic

Figure 9:
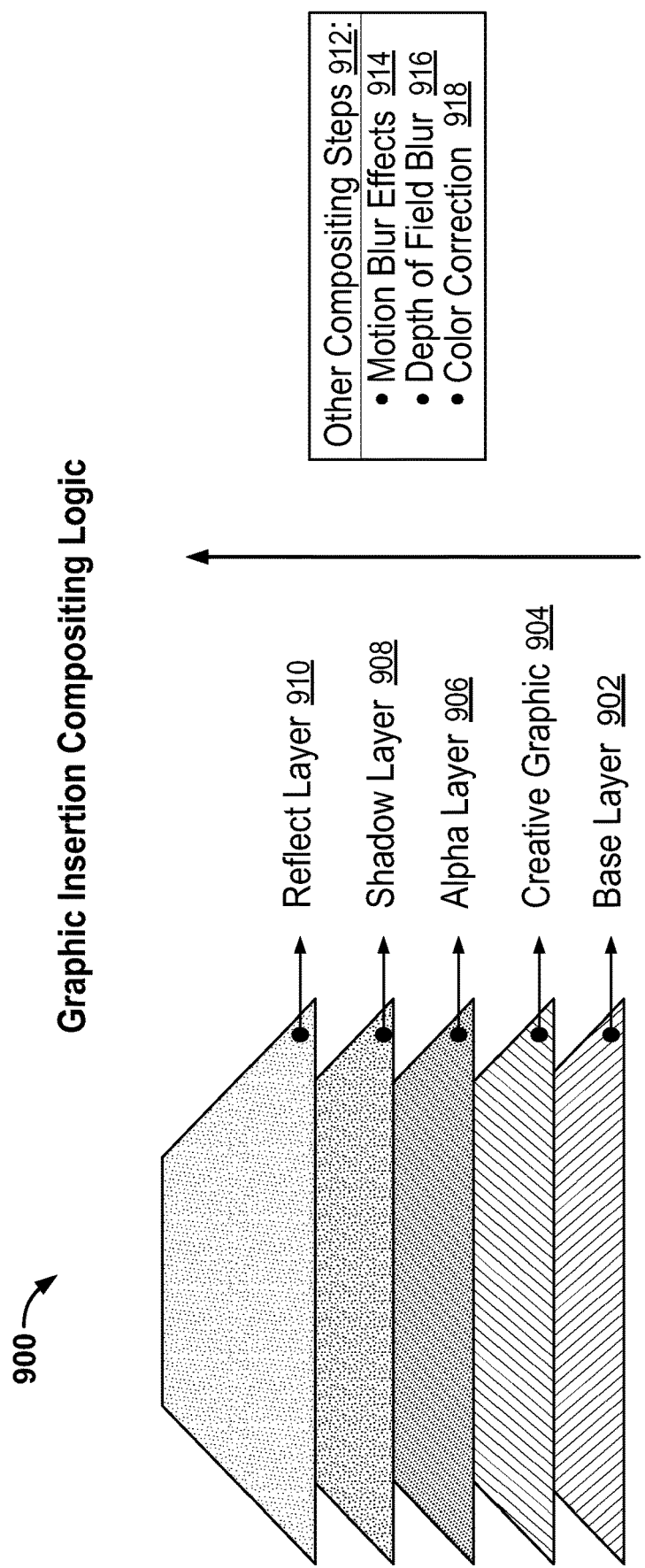
FIG. 9 illustrates graphic insertion compositing logic, according to some embodiments.

In-scene compositing logic may be used to accomplish graphic insertion formats and product insertion formats in order to generate their respective outputs. According to some embodiments, FIG. 9 illustrates an in-scene composite process, specifically using graphic insertion compositing logic 900. Graphic insertion formats may consist of compositing messaging or graphics (e.g., creative graphics) onto flat surfaces within a scene in order to create the illusion that the messaging is part of the scene that was previously filmed.

According to some embodiments, in order to accomplish a realistic composite, the graphic insertion compositing service may use one or more of the following as inputs: collection of base layer images, creative graphics for inserting, collection of coordinate values for creative graphic positioning, collection of alpha layer images, collection of shadow layer images, collection of reflect layer images, collection of motion blur values, collection of depth of field blur values, among others. It is worth noting that the size of each "collection" may be directly correlated to the total number of video frames (images) in the placement video (e.g., one image/value per video frame). Each of the layered inputs are described further below.

As shown in FIG. 9, the first layer of compositing service 900 as executed by graphic insertion formats is base layer 902. Base layer 902 includes the original content for the placement video to be used as a background image, according to some embodiments. This allows the transparency portions of the uploaded creative graphic to blend with the background of the original placement video.

The second layer of compositing service 900 as executed by graphic insertion formats may be creative graphic layer 904. The coordinates for inserting a creative graphic may be identified through a computer vision process, such as the Automated Placement Opportunity Identification engine as described above.

A third layer of compositing service 900 as executed by graphic insertion formats may be alpha layer 906. Alpha layer 906 closely resembles the original base layer 902, however, alpha layer 906 contains a "cut-out" or an application area of in which a creative graphic may be inserted. The cut-out or application area may be added on top of the creative graphic layer 904 in order to generate shadows, objects, or any elements in the scene that may cover up the creative graphic. Similarly, this layer handles characters blocking the creative graphic and illustrates the motion thereof. According to some embodiments, generating an alpha layer may further include identifying measurements on a z-axis for objects within the displayed within the application area to determine which items or graphics are displayed by the alpha layer 906.

A fourth layer of compositing service 900 as executed by graphic insertion formats may be shadow layer 908. Shadow layer 908 may generate realistic shadows blended into the environment of the scene. According to various embodiments, these shadows may be realistically inserted by using a multiply blend mode.

A fifth layer of compositing service 900 as executed by graphic insertion formats may be reflect layer 910. Reflect layer 910 may generate reflections over the layers as described above in order to match the environment of the scene. According to various embodiments, these reflections may be realistically inserted by using a screen blend mode.

According to some embodiments, the layers as described above are combined or otherwise composited together for a single frame of the entire placement video. The layering and compositing process are performed repeatedly for each frame of a placement video clip. For example, if a 1 minute video clip has a frame rate of 30 frames per second, this layering and compositing process may be performed once per frame for a total of about 1,800 times.

In addition to the layering and blend modes as described above, the compositing process may further include numerous other compositing steps. According to some embodiments, other compositing steps 912 may be executed on the graphic after the other layers or alterations (e.g., 902-910) have been finalized. Alternatively, some embodiments provide for applying other compositing steps 912 prior to the other layers or graphics (e.g., 902-910) have been finalized or otherwise generated for application to the creative graphic. Other compositing steps 912 may include, but are not limited to, one or more of the following steps: motion blur effects 914, depth of field blur 916, and color correction 918. In yet some further embodiments, other compositing steps 912 may be applied during the generation or otherwise application of the layers and graphics as demonstrated through 902-910.

According to some embodiments, one of the other compositing steps 912 may include motion blur effects 914. Motion blur effects 914 may be used to generate artificial camera motion blur and composites such a blur onto the creative graphic inserted at creative graphic layer 904, along with the layers composited thereabove (e.g., alpha layer 906, shadow layer 908, reflect layer 910), according to some embodiments. The amount of motion blur can be described as an integer or index that represents the number of samples to average together in between frames.

Another type of blur that can be generated onto the above layers is depth of field blur, which is unrelated to the motion of the camera. Many camera lenses, including those used to film large studio productions, have a depth of field which can be understood as the physical distance that can be in-focus at any given time. In other words, the distance from the camera in which light will converge precisely at the place of the sensor. Therefore, subjects and objects captured by a camera will vary in how much they are in focus, which—to the viewer—corresponds to how sharp or blurry objects may appear.

In order to accurately generate and realistically composite such a blur, a scalar representation may be used to estimate the amount of depth of field blur that can be used to artificially blur the creative graphic layer 904, along with the layers composited thereabove. According to some embodiments, depth of field blur effects 916 may be used to generate artificial depth of field blur and composite such a blur onto the creative graphic inserted at creative graphic layer 904, along with the layers composited thereabove (e.g., alpha layer 906, shadow layer 908, reflect layer 910).

The amount of depth of field blur can be changed throughout a scene as the camera changes its focus as the scene plays out. As the depth of field changes throughout the video clip, the artificial depth of field blur will change as well. Therefore, the depth of field blur may be represented by a collection of values (one value for each video frame) rather than a single scalar for the entire video clip.

One of the compositing steps 912 includes color correction 918, according to some embodiments. The creative graphic can be color corrected to match the color of the scene. This correction may include color hue adjustments to any of the RGB channels, adjustments to the alpha channel, brightness adjustments, contrast adjustments, or the addition of noise or grain. These adjustments may be made uniformly across the entire creative asset or non-uniformly based on the specific color and lighting conditions of the placement.

Figure 10:
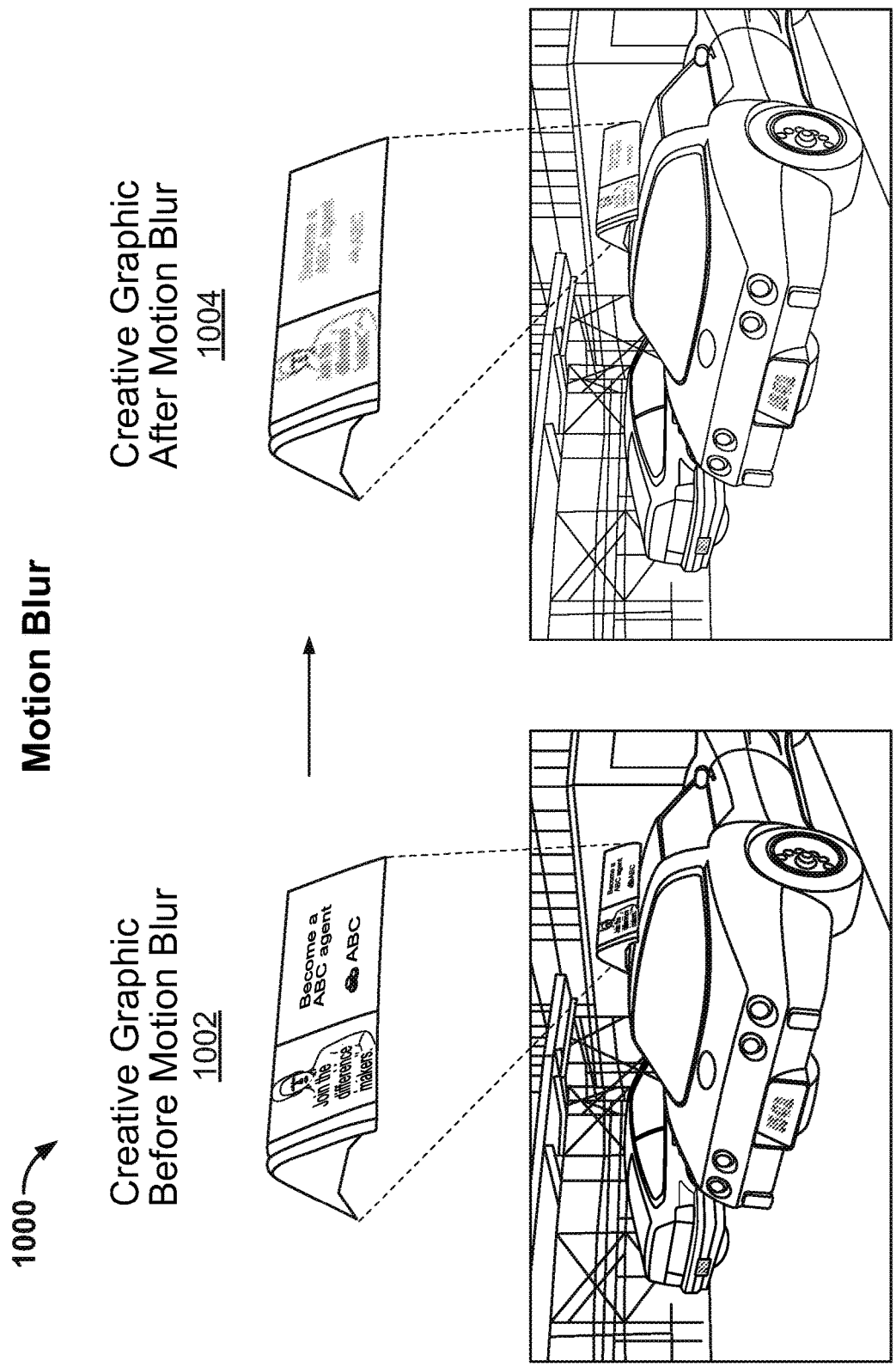
FIG. 10 illustrates an exemplary insertion of a motion blur effect, according to some embodiments.

FIG. 10 illustrates an exemplary insertion of a motion blur effect, according to some embodiments. According to some embodiments, a motion blur effect procedure 1000 may analyze an image before applying motion blur to a creative graphic. The creative graphic 1002 shows what a creative graphic may look like before a motion blur effect is applied using compositing logic. Creative graphic 1004 demonstrates what creative graphic 1002 would look like with motion blur effects applied using compositing logic as described above. According to some embodiments, motion blur effects may be determined or otherwise generated by Fast Fourier Transform calculations, Variance of LaPlacian kernels, focus-measure operators (e.g., gradient-based oerators, Laplacian-based operators, wavelet-based operators, statistics-based operators, DCT-based operators), or Gaussian-kernels, among others. According to some embodiments, the motion blur effect may be generated from a blur analysis of the pixels surrounding the placement. For example, in FIG. 10, the blur applied to the advertisement at 1004 may be equivalent to the blur identified by a blur analysis of the pixels that make up the vehicle on which the advertisement may be placed. According to some embodiments, depth of field blur may be generated and otherwise applied in a similar manner, wherein the pixels surrounding the placement may be analyzed for depth of field blur and, thus, generates a blur to apply to the creative graphic. For example, while generating the creative graphic (e.g., 904) as shown in 1004, the system may track the x, y coordinates of the advertisement on the vehicle for inserting the creative graphic at such x, y coordinates. Similarly, this tracking may also be used to calculate the pixel deltas between frames of a video in order to determine the apparent speed of the vehicle or otherwise the motion blur applicable to the advertisement placed thereon. The generation and application of the motion blur as demonstrated in motion blur procedure 1000 may be accomplished through one or more steps as described in compositing service 900 (e.g., creative graphic 904, motion blur effects 914, among others).

Figure 11:
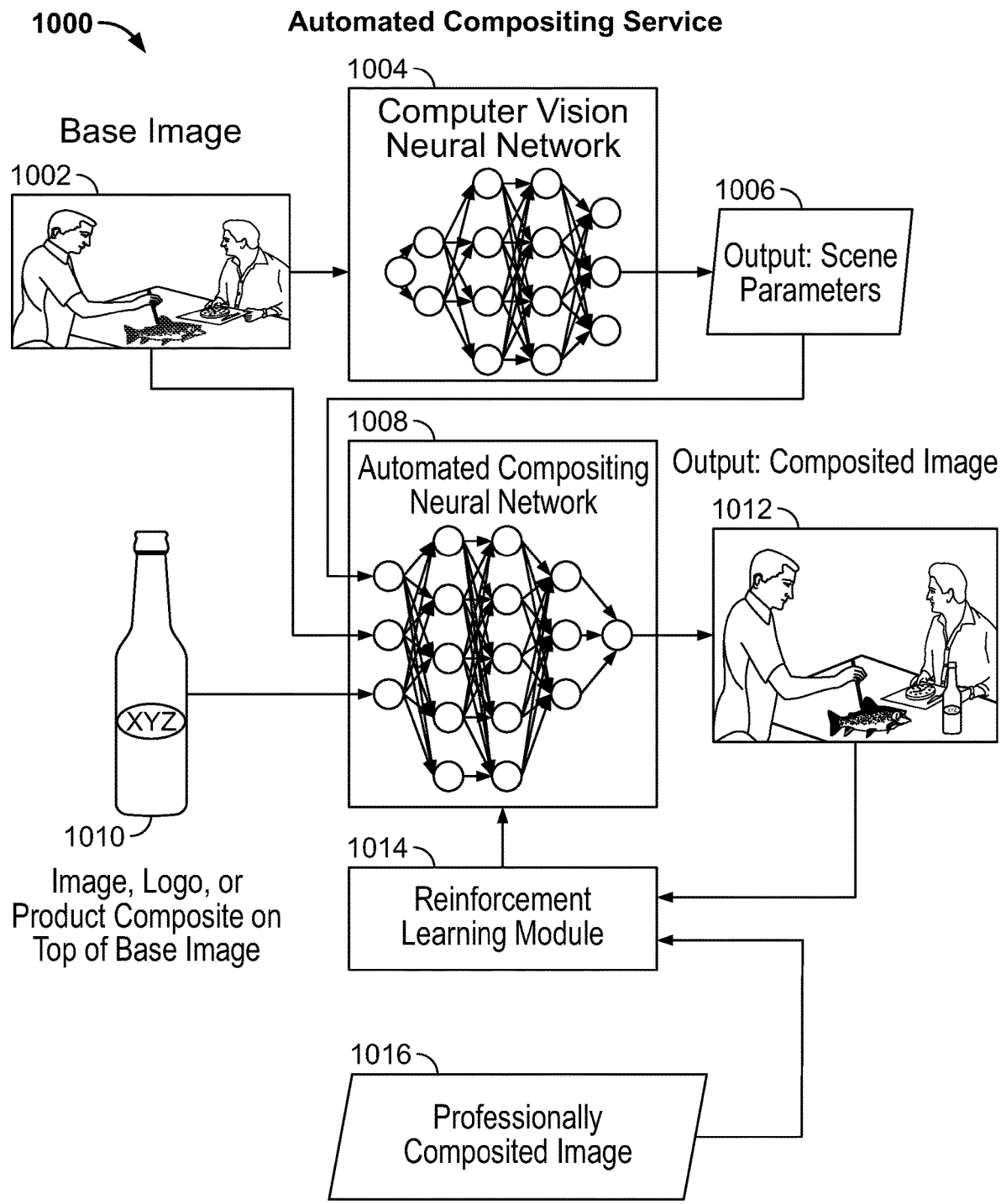
FIG. 11 illustrates an automated compositing service, according to some embodiments.

FIG. 11 illustrates an automated compositing service, according to some embodiments. The automated compositing service 1100 receives as input at least a base image 1102 and a creative graphic 1110. According to some embodiments, base image 1102 may be one or more of a media dataset, such as an image, a single video frame, or multiple video frames. Automated compositing service 1100 may include one or more neural networks, such as a computer vision neural network 1104 and a compositing neural network 1108. Base image 1102 may be analyzed by computer vision neural network 1104 to determine scene parameters 1106. Scene parameters 1106 may include various characteristics of base image 1102, including, but not limited to, camera data, objects in the scene, context of the scene, transformations performed on the scene, light data of the scene, materials in the scene, geometry data of the scene, among other data related to base image 1102.

The output of computer vision neural network 1104 (e.g., scene parameters 1106) may be used as input for compositing neural network 1108. According to some embodiments, compositing neural network 1108 may receive as input base image 1102, scene parameters 1106, as well as creative graphic 1110. Creative graphic 1110 may include an image, a logo, or a product, among other data, to be composited into the scene of base image 1102. Compositing neural network 1108 may generate as output a composited image 1112, which may include a copy of base image 1102 with the creative graphic 1110 composited therein. Composited image 1112 may be in the same format as base image 1102. For example, if base image 1102 is a series of video frames from a particular scene in a television show, composited image 1102 may include the same series of video frames with the creative graphic altered onto each frame.

According to some embodiments, the output of compositing neural network 1108 (e.g., composited image 1112) may be used to update compositing neural network 1108. For example, composited image 1112 may be compared to another composited image in order to retrain or otherwise identify improvements to be made through a reinforcement learning module 1114. Composited image 1112 may be analyzed using a loss/reward function of compositing neural network 1108 implemented by reinforcement learning module 1114 to identify the differences between a professionally composited image 1116 and composited image 1112. Professionally composited image 1116 may be generated by a human visual effects artist or otherwise previously identified as a good composite.

Reinforcement learning module 1114 may then provide to compositing neural network 1108 instructions to shift node values using backpropagation methods in order for compositing neural network 1108 to generate an output more similar to a professionally composited image (e.g., professionally composited image 1116). Reinforcement learning module 1114 may directly instruct the backpropagation of compositing neural network 1108 or may alternatively provide the data for compositing neural network 1108 to perform its own backpropagation, according to some embodiments.

Computer-Based Implementations

In some examples, some or all of the processing described above can be carried out on a personal computing device, on one or more centralized computing devices, or via cloud-based processing by one or more servers. In some examples, some types of processing occur on one device and other types of processing occur on another device. In some examples, some or all of the data described above can be stored on a personal computing device, in data storage hosted on one or more centralized computing devices, or via cloud-based storage. In some examples, some data are stored in one location and other data are stored in another location. In some examples, quantum computing can be used. In some examples, functional programming languages can be used. In some examples, electrical memory, such as flash-based memory, can be used.

General-purpose computers, network appliances, mobile devices, or other electronic systems may also be included in an example system implementing the processes described herein. Such a system can include a processor, a memory, a storage device, and an input/output device. Each of the components may be interconnected, for example, using a system bus. The processor is capable of processing instructions for execution within the system. In some implementations, the processor is a single-threaded processor. In some implementations, the processor is a multi-threaded processor. The processor is capable of processing instructions stored in the memory or on the storage device.

The memory stores information within the system. In some implementations, the memory is a non-transitory computer-readable medium. In some implementations, the memory is a volatile memory unit. In some implementations, the memory is a non-volatile memory unit.

The storage device is capable of providing mass storage for the system. In some implementations, the storage device is a non-transitory computer-readable medium. In various different implementations, the storage device may include, for example, a hard disk device, an optical disk device, a solid-date drive, a flash drive, or some other large capacity storage device. For example, the storage device may store long-term data (e.g., database data, file system data, etc.). The input/output device provides input/output operations for the system. In some implementations, the input/output device may include one or more of a network interface device, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device may be implemented in a distributed way over a network, such as a server farm or a set of widely distributed servers, or may be implemented in a single computing device.

Although an example processing system has been described, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

We claim:

1. A method of digital image composition, the method comprising:
receiving, by a computer processor, a primary image asset comprising a plurality of areas of interest;
automatically identifying, by the computer processor, first and second areas of interest to include in a composite image,
wherein the first area of interest is identified as at least a portion of a surface of an object depicted in the primary image asset;
training a first model to recognize one or more features of interest in an image asset using a plurality of image assets comprising pre-labelled features of interest;
receiving, by the computer processor, a secondary image asset comprising one or more features of interest;
automatically identifying, by the computer processor, a first one of the one or more features of interest in the secondary image asset to include in the composite image by providing as input to the first model the secondary image asset and receiving as output from the first model the first one of the one or more features of interest;
generating, by a second model, the composite image by combining at least a portion of the primary image asset that includes the first and second areas of interest with at least a portion of the secondary image asset that includes the first one of the one or more features of interest,
wherein the combining comprises compositing the at least a portion of the secondary image asset and the at least a portion of the primary image asset, and
wherein the compositing comprises overlaying the at least a portion of the secondary image asset on the at least a portion of the surface of the object;
comparing the composite image with a specific composite image to obtain a comparison result; and
updating the second model based on the comparison result.

2. The method of claim 1, wherein automatically identifying the first area of interest comprises:
extracting, by way of one or more neural networks, characteristics of the primary image asset, the characteristics representative of visually flat surfaces located at a particular location in the primary image asset;
generating, by the computer processor, a confidence value for each of the characteristics of the primary image asset;
determining, by the computer processor, a best characteristic, wherein the best characteristic comprises a highest one of the confidence values; and
labelling, by way of the one or more neural networks, the particular location associated with the best characteristic as the first area of interest.

3. The method of claim 1, wherein automatically identifying the second area of interest comprises:
extracting, by way of one or more neural networks, characteristics of the primary image asset, the characteristics indicative of a particular location in the primary image asset;
generating, by the computer processor, a confidence value for each of the characteristics of the primary image asset;
determining, by the computer processor, a best characteristic, wherein the best characteristic comprises a highest one of the confidence values;
labelling, by way of the one or more neural networks, the particular location associated with the best characteristic as the first area of interest.

4. The method of claim 3, wherein the characteristics of the primary image asset include one or more of the following:
common objects visually present within the primary image asset;
text visually present within the primary image asset;
categorical data representative of the scene as presented in the primary image asset; and
audio data comprising recognizable words or speech provided with the primary image asset.

5. The method of claim 1, wherein automatically identifying the first feature of interest comprises automatic logo identification as provided by one or more neural networks.

6. The method of claim 1, wherein creating the composite image further comprises manipulating dimensions of the composited image assets to match a predetermined output dimension.

7. The method of claim 1, wherein the primary image asset is indicative of a digital video asset comprising a series of image assets, wherein the method is programmatically repeated for each image asset of the series.

8. The method of claim 7, wherein each series of image assets are extracted from a digital video asset by:
receiving, at the computer processor, the digital video asset;
processing, by way of one or more neural networks, pixels of the digital video asset;
identifying, by the one or more neural networks, a first shot boundary of the digital video asset and a second boundary of the digital video asset;
extracting, by the computer processor, one or more video frames located between the first shot boundary and the second shot boundary of the digital video asset; and
generating, by the computer processor, a series of image assets from the one or more video frames as extracted.

9. A system for compositing digital images, comprising:
a processor; and
a non-transitory computer-readable medium for storing computer-executable instructions that, when executed by the processor, program the processor to perform operations comprising:
receiving a primary image asset comprising a plurality of areas of interest;
automatically identifying first and second ones of the areas of interest to include in a composite image, wherein the first area of interest is identified as at least a portion of a surface of an object depicted in the primary image asset;
training a first model to recognize one or more features of interest in an image asset using a plurality of image assets comprising pre-labelled features of interest;
receiving a secondary image asset comprising one or more features of interest;
automatically identifying a first one of the one or more features of interest in the secondary image asset to include in the composite image by providing as input to the first model the secondary image asset and receiving as output from the first model the first one of the one or more features of interest;

generating the composite image by combining at least a portion of the primary image asset that includes the first and second ones of the areas of interest with at least a portion of the secondary image asset that includes the first one of the one or more features of interest, wherein the combining comprises compositing the at least a portion of the secondary image asset and the at least a portion of the primary image asset, and wherein the compositing comprises overlaying the at least a portion of the secondary image asset on the at least a portion of the surface of the object;

comparing the composite image with a specific composite image to obtain a comparison result; and updating a second model based on the comparison result.

10. The system of claim 9, wherein automatically identifying the first area of interest comprises:

extracting characteristics of the primary image asset using one or more neural networks, the characteristics representative of visually flat surfaces located at a particular location in the primary image asset;

generating a confidence value for each of the characteristics of the primary image asset;

determining a best characteristic, wherein the best characteristic comprises the highest confidence value;

labelling the particular location associated with the best characteristic as the first area of interest using the one or more neural networks.

11. The system of claim 9, wherein automatically identifying the second area of interest comprises:

extracting characteristics of the primary image asset using the one or more neural networks, the characteristics indicative of a particular location in the primary image asset;

generating a confidence value for each of the characteristics of the primary image asset;

determining a best characteristic, wherein the best characteristic comprises the highest confidence value;

labelling the particular location associated with the best characteristic as the first area of interest using the one or more neural networks.

12. The system of claim 9, wherein the characteristics of the primary image asset include one or more of the following:

common objects visually present within the primary image asset;

text visually present within the primary image asset;

categorical data representative of the scene as presented in the primary image asset; and audio data comprising recognizable words or speech provided with the primary image asset.

13. The system of claim 9, wherein automatically identifying the first feature of interest comprises automatic logo identification as provided by one or more neural networks.

14. The system of claim 9, wherein creating the composite image further comprises manipulating dimensions of the composited image assets to match a predetermined output dimension.

15. The system of claim 9, wherein the primary image asset is indicative of a digital video asset comprising a series of image assets, wherein the operations are programmatically repeated for each image asset of the series.

16. The system of claim 15, wherein the series of image assets are extracted from the digital video asset by operations comprising:

receiving the digital video asset;

processing pixels of the digital video asset using the one or more neural networks;

identifying a first shot boundary of the digital video asset and a second boundary of the digital video asset using the one or more neural networks;

extracting one or more video frames located between the first shot boundary and the second shot boundary of the digital video asset;

generating a series of image assets from the one or more video frames as extracted.

* * * * *